(12) United States Patent
Yu et al.

(10) Patent No.: US 11,356,237 B1
(45) Date of Patent: Jun. 7, 2022

(54) HDMI SIGNAL COMMUNICATION OVER AN OPTICAL LINK

(71) Applicant: WINGCOMM Co. Ltd., Nantong (CN)

(72) Inventors: Jianming Yu, Nantong (CN); Zuodong Wang, Beijing (CN); Wei Mao, Palo Alto, CA (US); Yun Bai, Beijing (CN)

(73) Assignee: WINGCOMM CO. LTD.

( * ) Notice: Subject to any disclaimer, the term of this patent is extended or adjusted under 35 U.S.C. 154(b) by 0 days.

(21) Appl. No.: 17/219,591

(22) Filed: Mar. 31, 2021

(30) Foreign Application Priority Data

Nov. 16, 2020 (CN) .......................... 202011276576.2

(51) Int. Cl.
  *H04L 5/16* (2006.01)
  *H04L 5/14* (2006.01)
  *H04B 10/25* (2013.01)

(52) U.S. Cl.
  CPC ............... *H04L 5/16* (2013.01); *H04B 10/25* (2013.01); *H04L 5/1461* (2013.01)

(58) Field of Classification Search
  CPC .......... H04B 10/25; H04L 5/16; H04L 5/1461
  USPC ........................................................ 398/41
  See application file for complete search history.

(56) References Cited

U.S. PATENT DOCUMENTS

| | | | | |
|---|---|---|---|---|
| 2010/0026790 A1* | 2/2010 | Ohba | .................... | G09G 5/006 348/51 |
| 2010/0128176 A1* | 5/2010 | Nakajima | .......... | H04N 21/4341 348/512 |
| 2013/0128124 A1* | 5/2013 | Suzuki | .................... | H04N 5/44 348/723 |
| 2019/0342517 A1* | 11/2019 | Nakajima | .............. | H04N 7/081 |

* cited by examiner

*Primary Examiner* — Dalzid E Singh
(74) *Attorney, Agent, or Firm* — David R. Stevens; Stevens Law Group

(57) ABSTRACT

Systems and methods for HDMI signal communication over an optical communication link are described. One aspect includes receiving an HDMI control signal from an HDMI master device, and another HDMI control signal from an HDMI sink terminal via a communication resources. The method identifies half-duplex communication resource contention between the HDMI control signal and the other HDMI control signal, and transitions a communication direction of the half-duplex communication resources to give the HDMI control signal precedence over the other HDMI control signal. Subsequent to transitioning the communication direction, the method transfers the HDMI control signal to the HDMI sink terminal via the communication resources. Subsequent to transferring the HDMI control signal, the method again transitions the direction of the half-duplex communication resources, and transfers the other HDMI control signal to the HDMI master device.

22 Claims, 12 Drawing Sheets

HDMI SIGNAL COMMUNICATION OVER AN OPTICAL LINK

BACKGROUND

Technical Field

The present disclosure relates to systems and methods that communicate one or more HDMI signals over an optical communication link.

Background Art

With the continuous development of display technology, display resolution continues to increase. The transmission rate of audio and video data ranges from 100 MHz to several gigahertz, to several tens of gigahertz. Communication philosophies such as Fiber-to-the-Desk of a display transmission system is a key aspect in the development of display technology. In addition to the definition of high-speed signals, HDMI (high definition multimedia interface), DVI (Digital Visual Interface) and other display transmission protocols also stipulate five low-speed signals: a Serial Data Line (SDA) signal, a Serial Clock Line (SCL) signal, a Hot Plug Detection (HPD) signal, a Consumer Electronics Control (CEC) signal and an Audio Return Channel (ARC) signal. These signals play an important role in display control (e.g., SDA and SCL), user manipulation (e.g., HPD), and audio feedback (ARC). Therefore, a low-cost, low-delay, high-reliability and high-compatibility optical fiber transmission capability of these low-speed signals plays a particularly important role in the realization of optical fiber HDMI and DVI.

However, SDA and SCL, which are half-duplex communication signals, are inherently not compatible with optical fiber communication because of this half-duplex nature, since a fiber optic channel supports only unidirectional communication. In addition, there is a bus arbitration problem in the single bus communication used by CEC, which also conflicts with the topology of point-to-point communication of optical fiber communication. The (analog) ARC signal also has certain requirements for the bandwidth of optical fiber transmission.

Contemporary solutions for HDMI protocol low-speed signal transmission may include techniques such as:

(1) A Direct Digital Control (DDC) signal at an HDMI signal source is connected to a local EEPROM (Electrically Erasable Programmable Read Only Memory), and the local EEPROM stores Extended Display Identification Data (EDID) information of general display equipment. A disadvantage of this scheme is that the EDID information of the actual display device cannot be read; hence the compatibility of the scheme is poor.

(2) EDID information at the display device is read after powering on, and is then transmitted to the source by optical fiber communication. The method can effectively copy the EDID of the display device at the source, so that the EDID information of the display device can be correctly read when the remote end initiates Direct Digital Control (DDC) communication. However, a shortcoming of this scheme is that it cannot support functions such as High-bandwidth Digital Content Protection (HDCP), HDMI Status and Control Data Channel (SCDC), clock extension, read request (the function where the display device actively pulls down the SDA signal to ask the source device to read its flag bit), and so on.

3) In the store-and-forward mode, DDC information is received first, and when the device side needs to respond, the SCL signal is actively pulled down to cause clock extension at the remote end, thus waiting for the slave device to respond. When the slave device responds, it returns to the source device and cancels the clock extension. This scheme can read EDID normally, support HDCP and SCDC, and extend the clock. However, a disadvantage of this scheme is that the response delay is long, and it is necessary to read the response from the slave device before feeding it back to the source device. The scheme is not effective when the source device does not support clock extension. Therefore, the compatibility of this scheme is poor. Moreover, in contemporary systems, there is no effective solution to the bus arbitration problem of CEC communication.

SUMMARY

Aspects of the invention are directed to systems and methods for transmitting one or more HDMI low-speed communication signals over an optical communication link. In one aspect, an HDMI source terminal implements a method to transmit and receive one or more HDMI control signals. A decoding and forwarding unit within the HDMI source terminal may receive an HDMI control signal from an HDMI master device via an electrical link. The HDMI source terminal may receive another HDMI control signal from an HDMI sink terminal via optical communication resources. The HDMI source terminal can internally convert the other HDMI control signal and forward the other HDMI control signal to the decoding and forward unit via another electrical link. The decoding and forwarding unit may identify communication resource contention between the HDMI control signal and the other HDMI control signal. The decoding and forwarding unit can transition a communication direction of half-duplex communication resources to give the HDMI control signal precedence over the other HDMI control signal.

Subsequent to transitioning the communication direction, the HDMI source terminal may transfer the HDMI control signal to the HDMI sink terminal via the half-duplex communication resources. Subsequent to transferring the HDMI control signal, the HDMI source terminal may again transition the direction of the half-duplex communication resources, and transfer the other HDMI control signal to the HDMI master device.

A method to transmit and receive one or more HDMI control signals may also include the HDMI sink terminal receiving an HDMI control signal from an HDMI slave device. A decoding and forwarding unit within the HDMI sink terminal can receive the HDMI control signal via an electrical link. The HDMI sink terminal may receive another HDMI control signal from an HDMI source terminal via optical communication resources. The HDMI sink terminal can internally convert the other HDMI control signal and forward the other HDMI control signal to the decoding and forward unit via another electrical link. The decoding and forwarding unit may identify communication resource contention between the HDMI control signal and the other HDMI control signal. The decoding and forwarding unit can transition a communication direction of half-duplex communication resources to give the other HDMI control signal precedence over the HDMI control signal.

Subsequent to transitioning the communication direction, the HDMI sink terminal may transfer the other HDMI control signal to the HDMI slave device. Subsequent to transferring the other HDMI control signal, the HDMI sink terminal may again transition the direction of the half-duplex communication resources, and transfer the HDMI control signal to the HDMI source terminal via the half-duplex communication resources.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
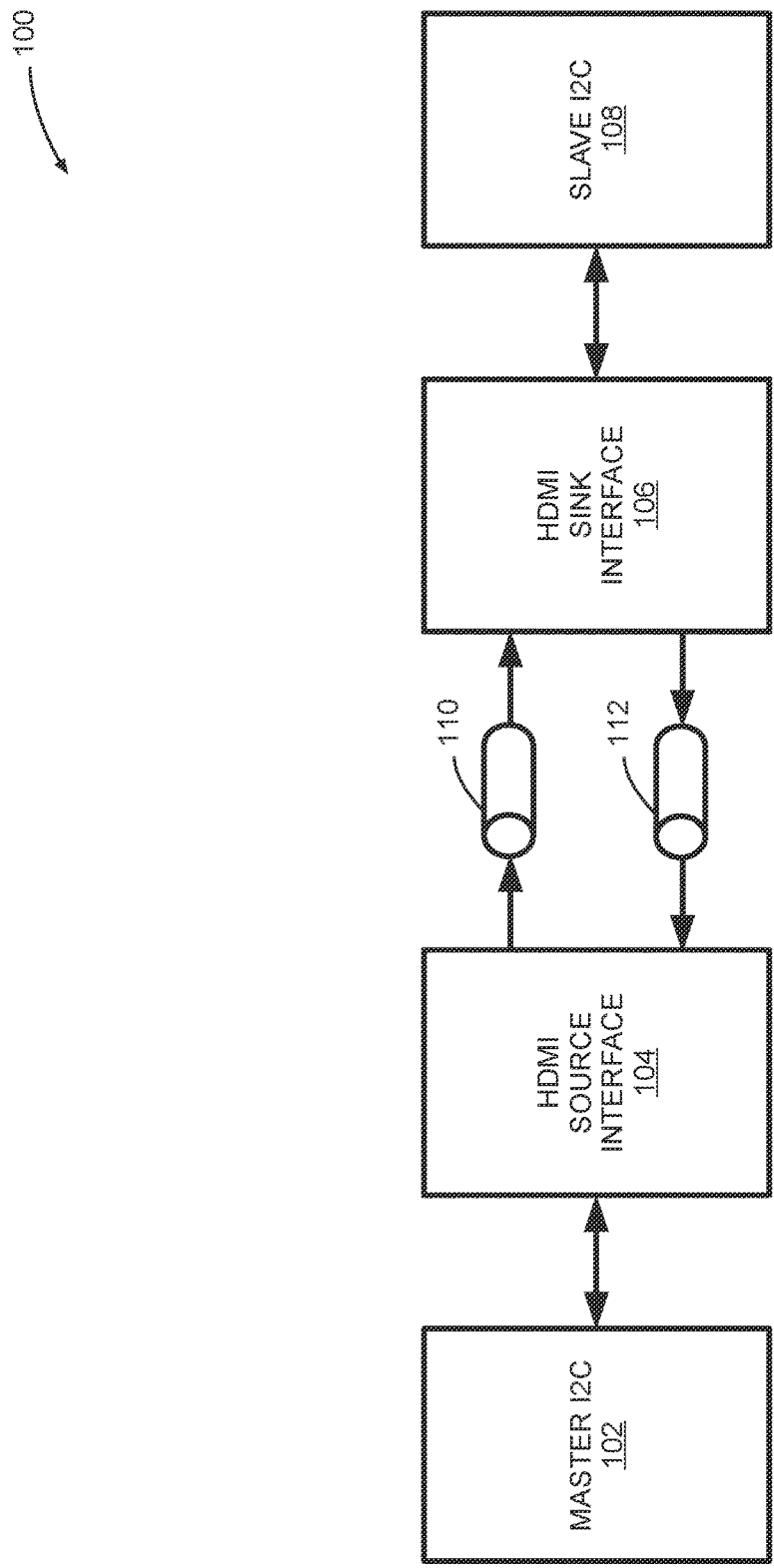
FIG. 1 is a block diagram depicting an example circuit architecture of an HDMI optical communication system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Aspects of the invention described herein are configured to provide an HDMI optical communication system for wire-speed forwarding of HDMI protocol low-speed signals. In one aspect, the HDMI optical communication system may include an HDMI source interface and an HDMI sink interface communicatively coupled (i.e., connected) via a full-duplex optical communication channel (e.g., including two simplex optical fibers, one optical fiber transferring data in each direction). In an aspect, the HDMI source interface and HDMI sink interface may each include an electro-optical, half-duplex functionality. Collectively, the HDMI source interface, the HDMI sink interface, and the optical communication channel, or portions thereof, may be referred to as "communication resources."

In an aspect, the HDMI source interface may be configured to analyze one or more HDMI source interface signals in real time, compress the signals, and transmit the compressed signals to the HDMI sink interface. The HDMI source interface may also be configured to receive reverse communication signals from the HDMI sink interface, decompress the reverse communication signals in real time, and transmit the decompressed signals to an HDMI source.

In an aspect, the HDMI sink interface may be configured to analyze the signals received from the HDMI source interface in real time, decompress the signals, and transmit the decompressed signals to an HDMI sink (e.g., a display device). The HDMI sink interface may also be configured to compress one or more signals generated by the HDMI sink in substantially real time and transmit the compressed signals to the HDMI source interface.

In an aspect, the HDMI source interface and the HDMI sink interface may include an HDMI source terminal and an HDMI sink terminal, respectively. Each of the HDMI source terminal and the HDMI sink terminal may be configured to switch an input/output (I/O) direction of one or more associated signals according to specific communication conditions, to realize low-latency bidirectional communication over an optical communication channel.

FIG. 1 is a block diagram depicting an example circuit architecture of an HDMI optical communication system 100. As depicted, HDMI optical communication system 100 includes a master I2C 102, an HDMI source interface 104, an HDMI sink interface 106, and a slave I2C 108. In an aspect, HDMI source interface 104 may be communicatively coupled with HDMI sink interface 106 via a full-duplex optical communication channel comprising an optical fiber 110 and an optical fiber 112. Optical fiber 110 is a unidirectional (simplex) optical communication channel configured to communicate data from HDMI source interface 104 to HDMI sink interface 106. Optical fiber 112 is a unidirectional (simplex) optical communication channel configured to communicate data from HDMI sink interface 106 to HDMI source interface 104. Collectively, optical fiber 110 and optical fiber 112 comprise a full-duplex optical communication channel.

In an aspect, each of HDMI source interface 104 and HDMI sink interface 106 may internally include half-duplex electro-optical communication functionality. Collectively, HDMI source interface 104, HDMI sink interface 106, optical fiber 110 and optical fiber 112, or portions thereof, comprise communication resources. In an aspect, the communication resources may be configured to communicate signals in a half-duplex manner.

In an aspect, master I2C 102 may be configured to transmit or receive one or more signals associated with an HDMI protocol, to and from HDMI source interface 104, respectively. In one aspect, these signals may be low-speed HDMI signals. Master I2C 102 may transmit one or more low-speed HDMI signals to HDMI source interface 104. In an aspect, these low-speed HDMI signals may be electrical signals. HDMI source interface 104 may convert these low-speed HDMI signals into optical low-speed HDMI signals, and transmit the optical low-speed HDMI signals over optical fiber 110 to HDMI sink interface 106. HDMI sink interface 106 may convert the received optical low-speed HDMI signals into electrical low-speed HDMI signals, and transmit these electrical low-speed HDMI signals to slave I2C 108.

In an aspect, slave I2C 108 may be configured to transmit or receive one or more signals associated with an HDMI protocol, to and from HDMI sink interface 106, respectively. In one aspect, these signals may be low-speed HDMI signals. Slave I2C 108 may transmit one or more low-speed HDMI signals to HDMI sink interface 106. In an aspect, these low-speed HDMI signals may be electrical signals. HDMI sink interface 106 may convert these low-speed HDMI signals into optical low-speed HDMI signals, and transmit these low-speed HDMI signals over optical fiber 112 to HDMI source interface 104. HDMI source interface 104 may convert the received optical low-speed HDMI signals into electrical low-speed HDMI signals, and transmit these electrical low-speed HDMI signals to master I2C 102. In this way, HDMI optical communication system 100 can transmit one or more I2C signals associated with low-speed HDMI signaling over a bidirectional optical channel.

In an aspect, master I2C 102 and HDMI source interface 104 communicate using an inter-integrated circuit (I2C) communication protocol and HDMI sink interface 106 and slave I2C communicate using an inter-integrated circuit (I2C) communication protocol. In one aspect, I2C communication up to 400 Khz can be supported by HDMI optical communication system 100, which can fully meet the requirements of HDMI and DVI protocols (i.e., low-speed signals associated with these protocols) at an I2C communication rate. In addition, different timing implementations of I2C communication may be used to perform different communication functions associated with low-speed HDMI or DVI signaling. For example, a clock extension of slave I2C 108 can be correctly reflected to master I2C 102 using the I2C communication protocol.

In an aspect, HDMI optical communication system 100 may be implemented as a connecting cable that connects an HDMI source (e.g., a computer or a DVD player) with an HDMI sink (e.g., a computer display or television). In such an implementation, I2C master 102, and HDMI source interface 104 may be integrated into a first HDMI connector, and HDMI sink interface 106, and I2C slave 108 may be integrated into a second HDMI connector. The first HDMI connector and the second HDMI connector may be optically coupled using an optical communication channel comprised of one or more optical fibers.

Figure 2:
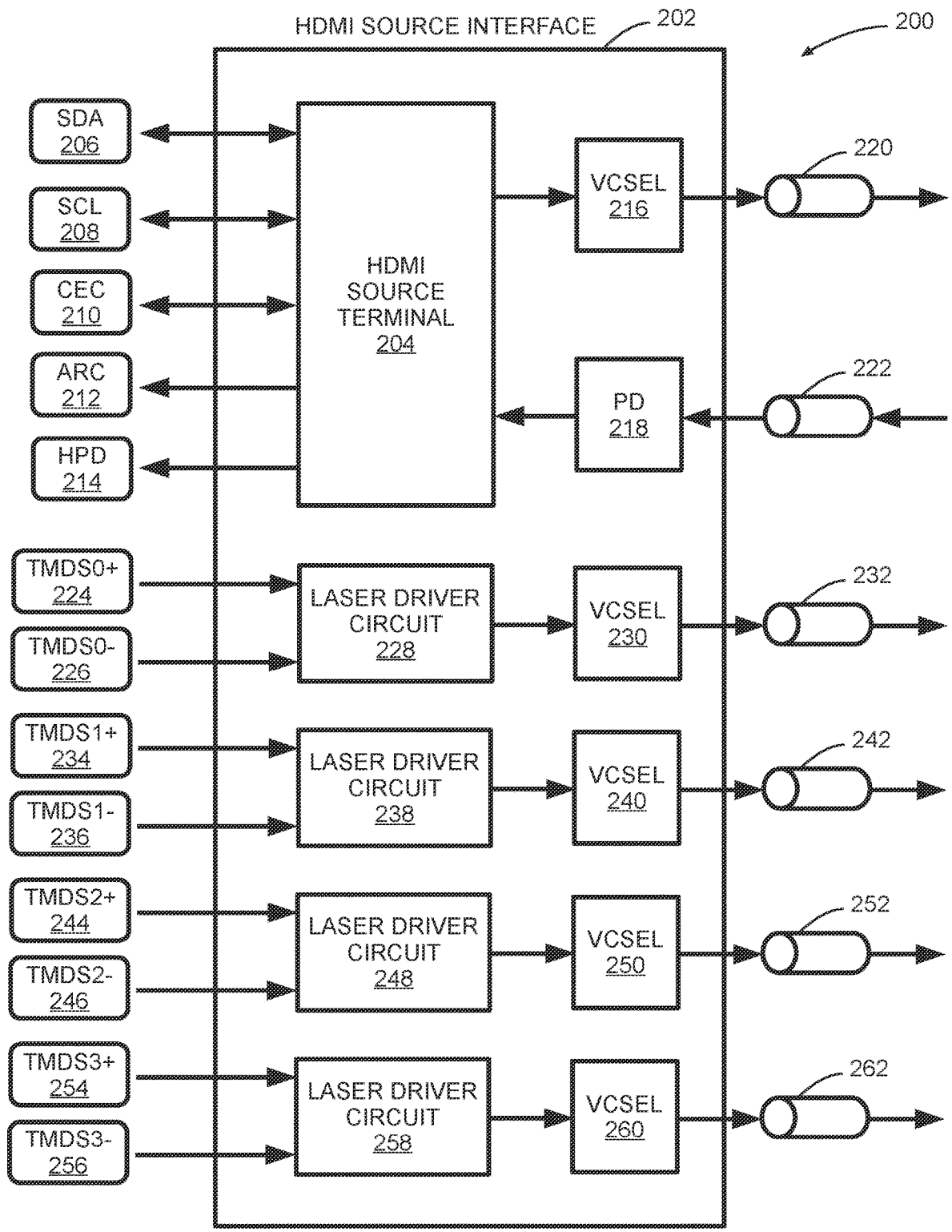
FIG. 2 is a block diagram depicting an example circuit architecture of an HDMI source optical interface.

FIG. 2 is a block diagram depicting an example circuit architecture of an HDMI source optical interface 200. As depicted, HDMI source optical interface 200 includes an HDMI source interface 202, an optical fiber 220, an optical fiber 222, an optical fiber 232, an optical fiber 242, an optical fiber 252, and an optical fiber 262. HDMI source interface 202 may further include an HDMI source terminal 204, a laser driver circuit 228, a laser driver circuit 238, a laser driver circuit 248, and a photodetector PD 218. HDMI source interface 202 may also include one or more vertical-cavity surface-emitting lasers (VCSELs), such as a VCSEL 216, a VCSEL 230, a VCSEL 240, a VCSEL 250, and a VCSEL 260.

In an aspect, each of laser driver circuit 228 through 258 is configured to receive a pair of differential transition-minimized differential signaling (TMDS) signals associated with an HDMI signal, from an HDMI signal source. For example, laser driver circuit 228 may receive a TMDS0+ 224 and a TMDS0− 226 pair of signals; laser driver circuit 238 may receive a TMDS1+ 234 and a TMDS1− 236 pair of signals; laser driver circuit 248 may receive a TMDS2+ 244 and a TMDS2− 246 pair of signals; and laser driver circuit 258 may receive a TMDS3+ 254 and a TMDS3− 256 pair of signals.

In an aspect, each of laser driver circuit 228 through 288 may be configured to transmit each pair of TMDS signals over an optical fiber, via a VCSEL. Each VCSEL receives electrical signals corresponding to a TMDS signal pair from an associated laser driver circuit, converts the electrical signals to an optical signal, and transmits the optical signal over an optical fiber to an HDMI source interface. For example, laser driver circuit 228 may be configured to transmit TMDS0+ 224 and TMDS0− 226 to VCSEL 230. VCSEL 230 converts TMDS0+ 224 and TMDS0− 226 to an optical signal and transmits the optical signal over optical fiber 232. Laser driver circuit 238 may be configured to transmit TMDS1+ 234 and TMDS1− 236 to VCSEL 240. VCSEL 240 converts TMDS1+ 234 and TMDS1− 236 to an optical signal and transmits the optical signal over optical fiber 242. Laser driver circuit 248 may be configured to transmit TMDS2+ 244 and TMDS2− 246 to VCSEL 250. VCSEL 250 converts TMDS2+ 244 and TMDS2− 246 to an optical signal and transmits the optical signal over optical fiber 252. Laser driver circuit 258 may be configured to transmit TMDS3+ 254 and TMDS3− 256 to VCSEL 260. VCSEL 260 converts TMDS3+ 254 and TMDS3− 256 to an optical signal and transmits the optical signal over optical fiber 262.

In an aspect, HDMI source terminal 204 is configured to process, transmit, and receive one or more status and control signals associated with an HDMI communication protocol. Examples of HDMI status and control signals include SDA 206, SCL 208, CEC 210, ARC 212, and HPD 214. In an aspect, HDMI source interface 202 may implement one or more functions that are similar to HDMI source interface 104. For example, the HDMI status and control signals SDA 206 through CEC 210 may be received by HDMI source terminal 204 from master I2C 102. HDMI source interface 102 may also be configured to transmit TMDS signals; this functionality is not depicted in FIG. 1.

In an aspect, HDMI source terminal 204 is configured to transmit SDA 206, SCL 208, and CEC 210 to an HDMI sink interface, and receive ARC 212 and HPD 214 from the HDMI sink interface. To further transmit (i.e., forward) SDA 206, SCL 208, and CEC 210, HDMI source terminal 204 may receive these signals as electrical signals. HDMI source terminal 204 may perform processing (e.g., time-division multiplexing and/or other processing functions) on these signals, and transmit the processed signals to VCSEL 216. VCSEL 216 converts these signals into optical signals and transmits the optically-converted signals to the HDMI sink interface via optical fiber 220.

In an aspect, photodetector PD 218 may be configured to receive SDA 206, SCL 208, CEC 210, ARC 212 and HPD 214 as time-division multiplexed optical signals via optical fiber 222. PD 218 converts these optical signals into electrical signals and transmits these electrical signals to HDMI source terminal 204. HDMI source terminal 204 may process these received electrical signals (e.g., perform time-division demultiplexing on the signals), and transmit these signals to master I2C 102.

In an aspect, transmission and reception of SDA 206, SCL 208, CEC 210, ARC 212 and HPD 214 by HDMI source terminal 204 may be performed as separate operations, in a half-duplex manner.

Figure 3:
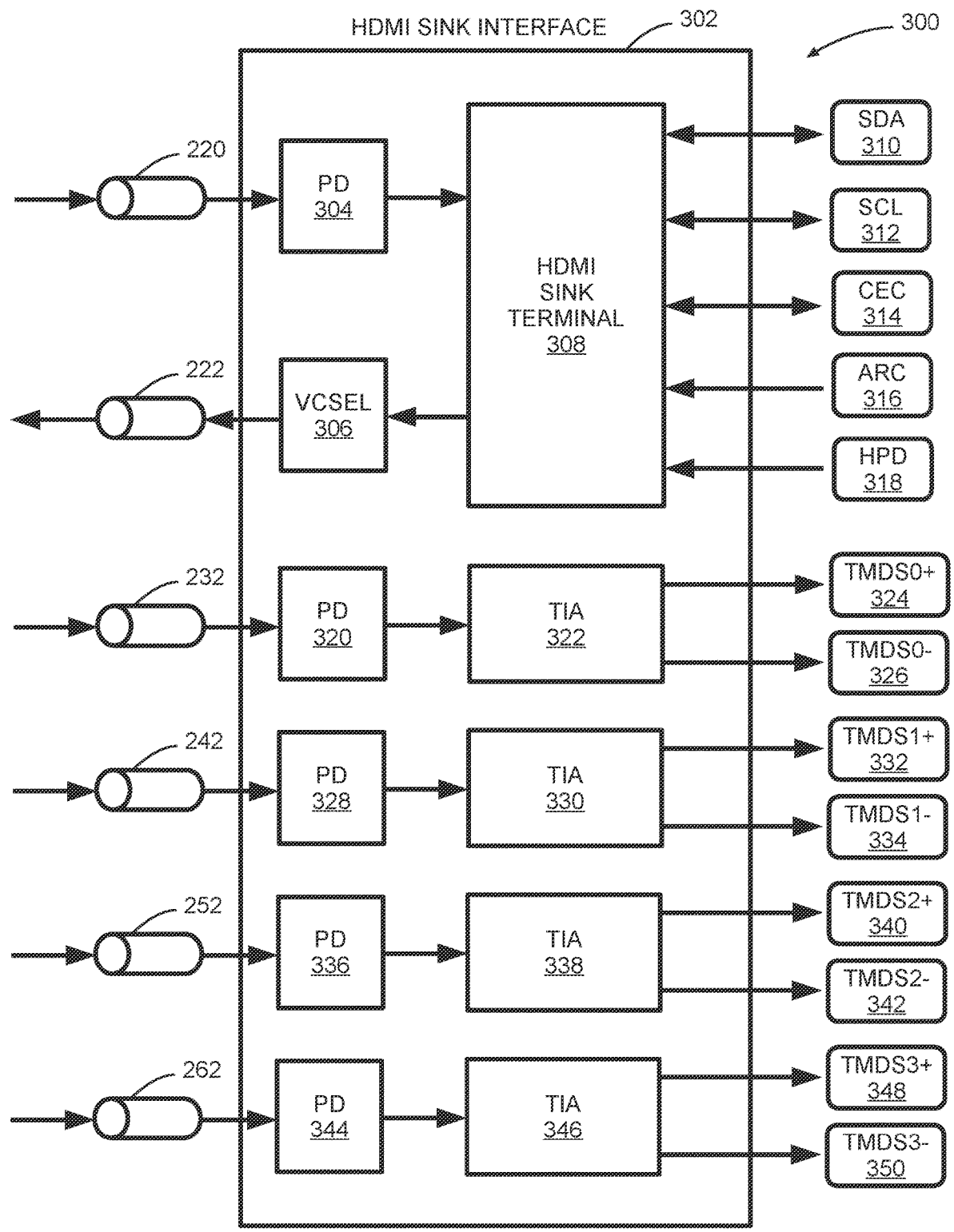
FIG. 3 is a block diagram depicting an example circuit architecture of an HDMI sink optical interface.

FIG. 3 is a block diagram depicting an example circuit architecture of an HDMI sink optical interface 300. As depicted, HDMI sink optical interface 300 includes an HDMI sink interface 302, optical fiber 220, optical fiber 222, optical fiber 232, optical fiber 242, optical fiber 252, and optical fiber 262. HDMI sink interface 302 may further include a PD 304, a VCSEL 306, a PD 320, a PD 328, a PD 336, a PD 334, and an HDMI sink terminal 308. HDMI sink interface 302 may also include one or more transimpedance amplifiers (TIAs) such as a TIA 322, a TIA 330, a TIA 338, and a TIA 346.

In an aspect, PD 320 is configured to receive an optical signal transmitted by VCSEL 230 over optical fiber 232; PD 328 is configured to receive an optical signal transmitted by VCSEL 240 over optical fiber 242; PD 336 is configured to receive an optical signal transmitted by VCSEL 250 over optical fiber 252; and PD 344 is configured to receive an optical signal transmitted by VCSEL 260 over optical fiber 262. Essentially, PD 320 receives an optical equivalent of TMDS0+ 224 and TMDS0− 226; PD 328 receives an optical equivalent of TMDS1+ 234 and TMDS1− 236; PD 336 receives an optical equivalent of TMDS2+ 244 and TMDS2− 246; and PD 344 receives an optical equivalent of TMDS3+ 254 and TMDS3− 256;

In an aspect, each of PD 320 through 344 converts the respective optical signal into an electrical counterpart, and transmits the associated electrical signal to a transimpedance amplifier (TIA). Each transimpedance amplifier amplifies the electrical signal and generates a TMDS signal pair corresponding to a TMDS signal pair received and transmitted by HDMI source interface 202. For example, PD 320 transmits an electrical signal to TIA 322. TIA 322 amplifies the electrical signal and outputs a TMDS0+ 324 and a TMDS0− 326 differential signal pair. The TMDS 0+ 324 and TMDS 0− 326 signals are received versions of the transmitted TMDS signal pair TMDS0+ 224 and TMDS0− 226, respectively. Also:

PD 328 transmits an electrical signal to TIA 330. TIA 330 amplifies the electrical signal and outputs a TMDS1+ 332 and a TMDS1− 334 differential signal pair. The TMDS1+ 332 and TMDS1− 334 signals are received versions of the transmitted TMDS signal pair TMDS1+ 234 and TMDS1− 236, respectively.

PD 336 transmits an electrical signal to TIA 338. TIA 338 amplifies the electrical signal and outputs a TMDS2+ 340 and a TMDS2− 342 differential signal pair. The TMDS2+ 340 and TMDS2− 342 signals are received versions of the transmitted TMDS signal pair TMDS2+ 244 and TMDS2− 246, respectively.

PD 344 transmits an electrical signal to TIA 346. TIA 346 amplifies the electrical signal and outputs a TMDS3+ 348 and a TMDS3− 350 differential signal pair. The TMDS3+ 348 and TMDS3− 350 signals are received versions of the transmitted TMDS signal pair TMDS3+ 254 and TMDS3− 256, respectively.

The TMDS signals—TMDS0+ 324 through TMDS3− 350 are transmitted to an HDMI sink.

In an aspect, time division-multiplexed signals SDA 206, SCL 208, and CEC 210 are received as optical signals by PD 304 via optical fiber 220. PD 304 may convert the optical signals to electrical signals and transmit these electrical signals to HDMI sink terminal 308. HDMI sink terminal 308 may process the received signals. This processing may include time-division demultiplexing, among other operations. HDMI sink terminal 308 outputs the processed signals as separate signals, e.g., an SDA 310, an SCL 312, and a CEC 314 that are received versions of SDA 206, SCL 208, and CEC 210, respectively. Signals SDA 310, SCL 312 and CEC 314 may be transmitted by HDMI sink terminal 308 to an HDMI sink.

In an aspect, HDMI sink terminal 308 may receive SDA 310, SCL 312, CEC 314, an ARC 316 and an HPD 318 signals from the HDMI sink. HDMI source terminal 204 may receive these signals as electrical signals. To further transmit (i.e., forward) the SDA 310, SCL 312, CEC 314, ARC 316 and HPD 318 signals, HDMI sink terminal 308 may perform processing (e.g., time-division multiplexing and/or other processing functions) on these signals, and transmit the processed signals to VCSEL 306. VCSEL 306 converts these signals into optical signals and transmits the optically-converted signals to the HDMI source interface via optical fiber 222. Ultimately, these signals are received by HDMI source interface 202 and output as SDA 206, SCL 208, CEC 210, ARC 212 and HPD 214 signals, respectively.

In an aspect, transmission and reception of SDA 206, SCL 208, CEC 210, ARC 212 and HPD 214 by HDMI sink terminal 308 may be performed as separate operations, in a half-duplex manner.

Figure 4:
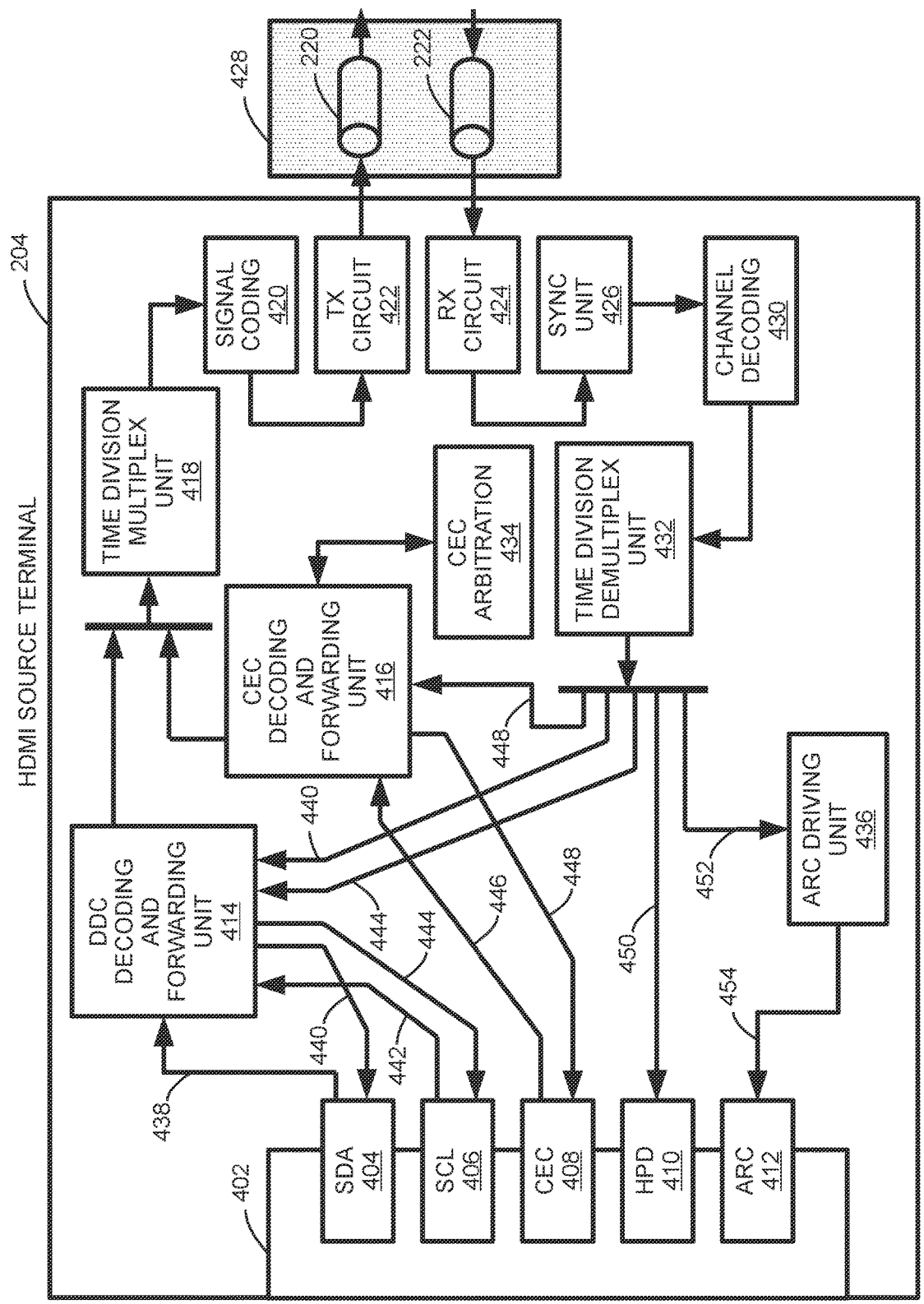
FIG. 4 is a block diagram depicting an example circuit architecture of an HDMI source terminal.

FIG. 4 is a block diagram depicting an example circuit architecture of HDMI source terminal 204. As depicted, HDMI source terminal 204 includes an interface 402, a DDC decoding and forwarding unit 414, a CEC decoding and forwarding unit 416, a time division multiplex unit 418, signal coding 420, a transmit (TX) circuit 422, a receiver (RX) circuit 424, a synchronization (sync) unit 426, channel decoding 430, a time division demultiplex unit 432, a CEC arbitration 434, and an ARC driving unit 436. Interface 402 may further include an SDA interface 404, an SCL interface 406, a CEC interface 408, an HPD interface 410, and an ARC interface 412. HDMI source terminal 204 may be configured to send and receive signals via a bidirectional optical communication channel 428 comprising optical fiber 220 and optical fiber 222.

In an aspect, HDMI source terminal 204 may be configured to send (transmit) and receive one or more HDMI control signals over an optical communication channel (i.e., optical communication resources) that includes TX circuit 422, RX circuit 424, optical fiber 220 and optical fiber 222. In an aspect, the HDMI control signals may include any combination of an SDA signal, an SCL signal, a CEC signal, an HPD signal, and an ARC signal.

In an aspect, one or more HDMI control signals may be transmitted by HDMI source terminal 204 using the optical communication resources. This transmission may be accomplished by time-division multiplexing the HDMI control signals prior to transmission over the optical communication channel. The HDMI control signals may be transmitted to an HDMI sink terminal such as HDMI sink terminal 308. The HDMI control signals transmitted may be any combination of an SDA signal 438, an SCL signal 442, and a CEC signal 446.

In an aspect, one or more HDMI control signals may be received by HDMI source terminal 204 using the optical communication resources. These HDMI control signals may be received from an HDMI sink terminal such as HDMI sink terminal 308. The HDMI control signals received may be any combination of an SDA signal 440, an SCL signal 444, a CEC signal 448, an HPD signal 450, and an ARC signal 454. In an aspect, these signals are received as optical signals over optical fiber 222, in a time-division multiplexed format. RX circuit 424 may include one or more photodetectors (e.g., PD 218) to convert the time-division multiplexed optical signals into time-division multiplexed electrical signals. The time-division multiplexed electrical signals are received by sync unit 426. Sync unit 426 is a synchronization unit that may be configured to perform bit synchronization and frame synchronization for the received signals.

In an aspect, SDA interface 404 is configured to both transmit and receive an SDA signal; SCL interface 406 is configured to transmit and receive an SCL signal; and CEC interface 408 is configured to transmit and receive a CEC signal, with each transmission and receiving being performed in a half-duplex manner. SDA interface 404 and SCL interface 406 may be connected to DDC decoding and forwarding unit 414. CEC interface 408 may be connected to CEC decoding and forwarding unit 416. DDC decoding and forwarding unit 414 may be configured to process DDC communication associated with HDMI source terminal 204. CEC decoding and forwarding unit 414 may be configured to process CEC communication associated with HDMI source terminal 204. In an aspect, CEC arbitration 434 may be connected to CEC decoding and forwarding unit 416 and may be configured to perform CEC arbitration and prevent CEC signal conflicts.

Under certain circumstances, an HDMI control signal may be scheduled to be transmitted to an HDMI sink terminal by HDMI source terminal 204, at the same time that an HDMI control signal is received from the HDMI sink terminal. This can lead to communication resource contention at HDMI source terminal 204, for each of the SDA signal, the SCL signal, and the CEC signal (e.g., identified within unit 414 or unit 416). To address, and potentially preempt, any communication resource contention, the transmitted and received SDA and SCL signals are processed by DDC decoding and forwarding unit 414, while the transmitted and received CEC signals are processed by CEC decoding and forwarding unit 416 and CEC arbitration 434.

In an aspect, when resolving any contention between SDA signal 438 (being transmitted to an HDMI sink terminal) and SDA signal 440 (being received from the HDMI sink terminal), DDC decoding and forwarding unit 414 may run a protocol analysis state machine that prioritizes a transmission of SDA signal 438 over a reception of SDA signal 440. In other words, for HDMI source terminal 204, SDA signal transmission is temporally prioritized over SDA signal reception. DDC decoding and forwarding unit 414 may transmit SDA signal 438 in substantially real time at an interval of a local clock.

In an aspect, when resolving any contention between SCL signal 442 (being transmitted to an HDMI sink terminal) and SCL signal 444 (being received from the HDMI sink terminal), DDC decoding and forwarding unit 414 may run a protocol analysis state machine that prioritizes a transmission of SCL signal 442 over a reception of SCL signal 444. In other words, for HDMI source terminal 204, SCL signal transmission is temporally prioritized over SCL signal reception. DDC decoding and forwarding unit 414 may transmit SDA signal 442 in substantially real time at an interval of a local clock.

In an aspect, when resolving any contention between CEC signal 446 (being transmitted to an HDMI sink terminal and CEC signal 448 (being received from the HDMI sink terminal), CEC decoding and forwarding unit 416 may run a protocol analysis state machine that prioritizes a transmission of CEC signal 446 over a reception of CEC signal 448. In other words, for HDMI source terminal 204, CEC signal transmission is temporally prioritized over CEC signal reception. CEC decoding and forwarding unit 416 may transmit CEC signal 446 in substantially real time at an interval of a local clock.

In an aspect, time division multiplex unit 418 receives SDA and SCL signals to be transmitted from DDC decoding and forwarding unit 414, and a CEC signal to be transmitted from CEC decoding and forwarding unit 416. Time division multiplex unit 418 may be configured to cyclically collect and combine an SDA signal and an SCL signal to be transmitted from DDC decoding and forwarding unit 414, and a CEC signal to be transmitted from CEC decoding and forwarding unit 416. These signals are combined into a single-channel signal using time-division multiplexing. In an aspect, the SDA, SCL, and CEC signals to be transmitted may be combined in any arbitrary temporal arrangement.

The time-division multiplexed signals generated by time division multiplex unit 418 may be output to signal coding 420. Signal coding 420 may be configured to perform Manchester encoding on the time-division multiplexed signals. This enables synchronization between HDMI source terminal 204 and HDMI sink terminal 308. An output from signal coding 420 is transmitted to TX circuit 422. TX circuit 422 is a transmission (transmit) circuit that is configured to convert one or more electrical signals (containing the time-division multiplexed SDA, SCL and CEC signals) into optical signals for transmission over optical fiber 220. To achieve this functionality, TX circuit 422 may include one or more VCSELs (e.g., VCSEL 216).

In an aspect, once the SDA, SCL and CEC signals (e.g., SDA signal 438, SCL signal 442, and CEC signal 446) have been transmitted, the received SDA and SCL signals (e.g., SDA signal 440, SCL signal 444) may be transmitted from DDC decoding and forwarding unit 414 to SDA interface 404 and SCL interface 406, respectively. Also, the received CEC signal (e.g., CEC signal 448) received from the HDMI sink terminal may be transmitted from CEC decoding and forwarding unit 416, to CEC interface 408. These SDA, SCL, and CEC signals are respectively transmitted from SDA interface 404, SCL interface 406, and CEC interface 408, to master I2C 102. In this way, half-duplex communication of the HDMI SDA, SCL and CEC signals using one or more optical resources is accomplished.

In one aspect, one or more HDMI signals may be received by HDMI source terminal 204 from an HDMI sink terminal via optical fiber 222. The received signals may include SDA signal 440, SCL signal 444, CEC signal 448, an HPD signal 450, and an ARC signal 452. These signals may be received in a time-division multiplexed format, as an optical signal. RX circuit 424 may convert this optical signal into an electrical signal using one or more photodetectors (e.g., PD 218). The electrical signal may be received by channel decoding 430 that is configured to convert any received signals that are Manchester-encoded into non-Manchester-encoded signals.

In an aspect, an output of channel decoding 430 may be received by time division demultiplex unit 432 that is configured to time-division demultiplex the received signals, into:

SDA signal 440 that is transmitted to DDC decoding and forwarding unit 414;
SCL signal 444 that is transmitted to DDC decoding and forwarding unit 414;
CEC signal 448 that is transmitted to CEC decoding and forwarding unit 416;
HPD signal 450 that is transmitted to HPD interface 410 for further transmission to master I2C 102; and
ARC signal 452 that is transmitted to ARC driving unit 436 for amplification and signal conditioning. ARC driving unit 436 may generate an ARC signal 454 that is transmitted to ARC interface 412 for further transmission to master I2C 102. In an aspect, ARC signal 454 is an analog signal.

In an aspect, among the HDMI SDA, SCL, HPD, CEC, and ARC signals, the ARC signals have a requirement for the transmission bandwidth, so 50% of the time-division multiplexing time slice may be occupied in time division multiplexing by the ARC signal, while the remaining communication bandwidth may be equally divided among the four signals CEC, HPD, SDA, and SCL.

In an aspect, HDMI source terminal 204 modulates one or more HDMI signals (i.e., SDA, SCL and CEC) into a form suitable for transmission over a physical (i.e., optical) channel. Generally, narrow-band communication is adopted for wireless communication, and signals are modulated onto high-frequency carriers for transmission, while PAM (Pulse Amplitude Modulation) can be adopted for copper wire or optical fiber channels. By adopting the above communication protocol, communication delay is reduced to within 50 ns, and the compatibility of a final display transmission scheme with different devices is realized.

Figure 5:
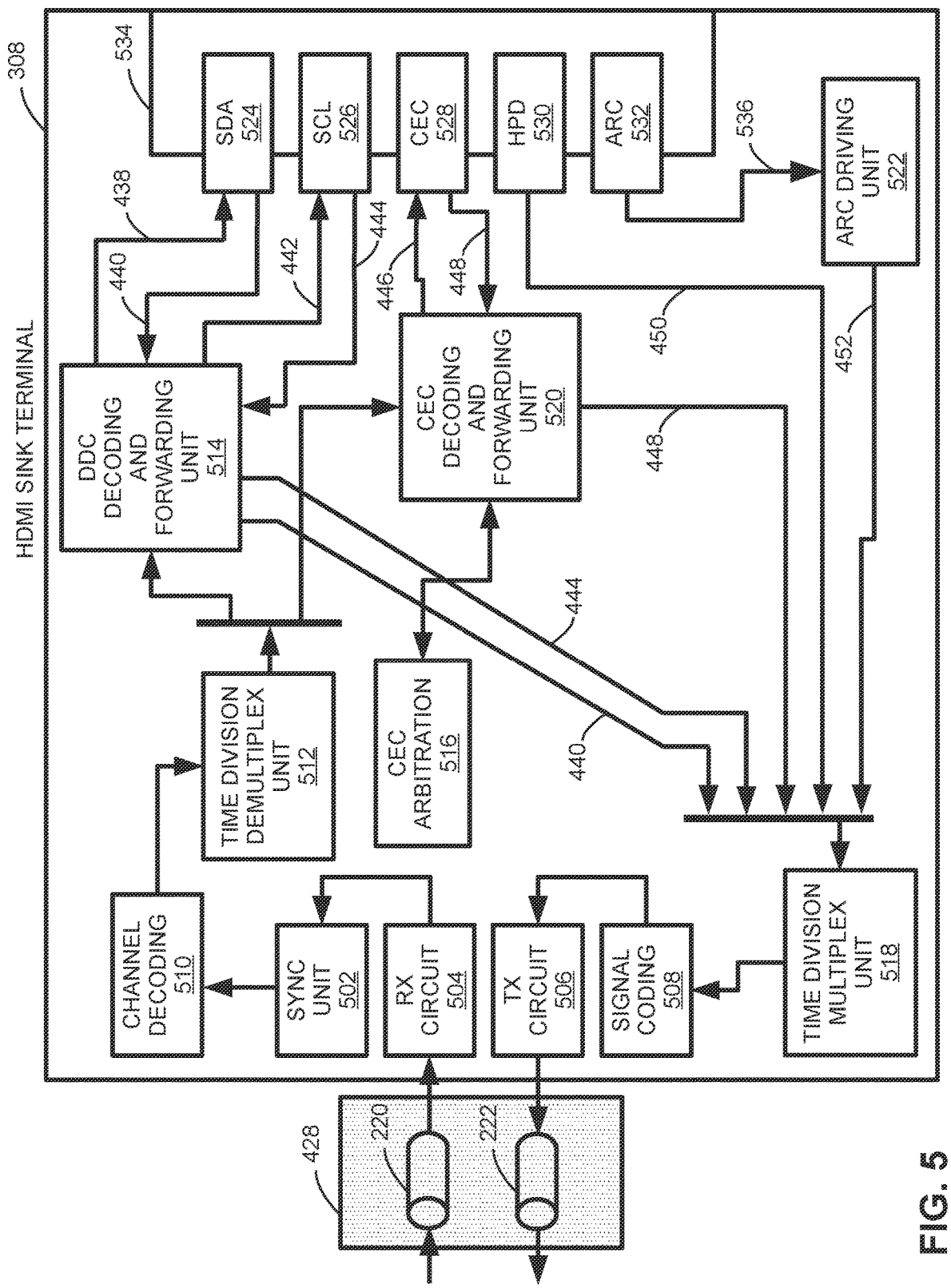
FIG. 5 is a block diagram depicting an example circuit architecture of an HDMI sink terminal.

FIG. 5 is a block diagram depicting an example circuit architecture of HDMI sink terminal 308. As depicted HDMI sink terminal 308 includes a channel decoding 510, a sync unit 502, a receive (RX) circuit 504, a transmit (TX) circuit 508, a signal coding 508, a time division demultiplex unit 512, a time division multiplex unit 518, a CEC arbitration 516, a DDC decoding and forwarding unit 514, a CEC decoding and forwarding unit 520, an interface 534, an ARC driving unit 522, an SDA interface 524, an SCL interface 526, a CEC interface 528, an HPD interface 530, an ARC interface 532, and an ARC driving circuit 522. HDMI sink terminal 308 may be configured to send and receive signals via a bidirectional optical communication channel 428 comprising optical fiber 220 and optical fiber 222.

In an aspect, HDMI source terminal 308 may be configured to send (transmit) and receive one or more HDMI control signals in a half-duplex manner over an optical communication channel (i.e., optical communication resources) that includes TX circuit 506, RX circuit 504, optical fiber 220 and optical fiber 222. In an aspect, the HDMI control signals may include any combination of an SDA signal, an SCL signal, a CEC signal, an HPD signal, and an ARC signal.

In an aspect, one or more HDMI control signals may be transmitted by HDMI sink terminal 308 using the optical communication resources. This transmission may be accomplished by time-division multiplexing the HDMI control signals prior to transmission over the optical communication channel. The HDMI control signals may be transmitted to an HDMI source terminal such as HDMI source terminal 204. The HDMI control signals transmitted may be any combination of SDA signal 440, SCL signal 444, CEC signal 448, HPD signal 450, and an ARC signal 452.

In an aspect, one or more HDMI control signals may be received by HDMI sink terminal 308 using the optical communication resources. These HDMI control signals may be received from an HDMI source terminal such as HDMI source terminal 204. The HDMI control signals received may be any combination of SDA signal 438, SCL signal 442, and CEC signal 446. In an aspect, these signals are received as optical signals over optical fiber 220, in a time-division multiplexed format. RX circuit 504 may include one or more photodetectors (e.g., PD 304) to convert the time-division multiplexed optical signals into time-division multiplexed electrical signals. The time-division multiplexed electrical signals are received by sync unit 502. Sync unit 502 is a synchronization unit that may be configured to perform bit synchronization and frame synchronization for the received signals.

In an aspect, SDA interface 524 is configured to both transmit and receive an SDA signal; SCL interface 526 is configured to transmit and receive an SCL signal; and CEC interface 528 is configured to transmit and receive a CEC signal, with each transmission and receiving being performed in a half-duplex manner. SDA interface 524 and SCL interface 526 may be connected to DDC decoding and forwarding unit 514. CEC interface 528 may be connected to CEC decoding and forwarding unit 520. DDC decoding and forwarding unit 414 may be configured to process DDC communication associated with HDMI sink terminal 308. CEC decoding and forwarding unit 520 may be configured to process CEC communication associated with HDMI sink terminal 308. In an aspect, CEC arbitration 516 may be connected to CEC decoding and forwarding unit 520 and may be configured to perform CEC arbitration and prevent CEC signal conflicts.

In an aspect, sync unit 502 outputs received time-division multiplexed SCA, SCL, and CEC signals from an HDMI source terminal (e.g., HDMI source terminal 204) to channel decoding 510. Channel decoding 510 may be configured to convert any received signals that are Manchester-encoded into non-Manchester-encoded signals. An output of channel decoding 510 is received by time division demultiplex unit 512. Time division demultiplex unit 512 may time-division demultiplex the signal received from sync unit 502 to extract SDA signal 438, SCL signal 442, and CEC signal 446. Of these signals, SDA signal 438 and SCL signal 442 are transmitted to DDC decoding and forwarding unit 514, while CEC signal 446 is transmitted to CEC decoding and forwarding unit 520.

Under certain circumstances, an HDMI control signal may be scheduled to be transmitted to an HDMI source terminal by HDMI sink terminal 308, at the same time that an HDMI control signal is received from the HDMI source terminal (e.g., HDMI source terminal 204). This can lead to communication resource contention at HDMI source terminal 308, for each of the SDA signal, the SCL signal, and the CEC signal (e.g., identified within unit 514 or unit 520). To address, and potentially preempt, any communication resource contention, the transmitted and received SDA and SCL signals are processed by DDC decoding and forwarding unit 514, while the transmitted and received CEC signals are processed by CEC decoding and forwarding unit 520 and CEC arbitration 516.

In an aspect, when resolving any contention between SDA signal 438 (being received from an HDMI source terminal) and SDA signal 440 (being sent to the HDMI source terminal), DDC decoding and forwarding unit 514 may run a protocol analysis state machine that prioritizes a receiving of SDA signal 438 over transmitting SDA signal 440. In other words, for HDMI sink terminal 308, SDA signal reception is temporally prioritized over SDA signal transmission.

In an aspect, when resolving any contention between SCL signal 442 (being received from an HDMI source terminal) and SCL signal 444 (being sent to the HDMI source terminal, DDC decoding and forwarding unit 514 may run a protocol analysis state machine that prioritizes a reception of SCL signal 442 over a transmission of SCL signal 444. In other words, for HDMI source terminal 204, SCL signal reception is temporally prioritized over SCL signal transmission.

In an aspect, when resolving any contention between CEC signal 446 (being received from an HDMI source terminal) and CEC signal 448 (being sent to the HDMI source terminal), CEC decoding and forwarding unit 520 may run a protocol analysis state machine that prioritizes a reception of CEC signal 446 over a transmission of CEC signal 448. In other words, for HDMI sink terminal 308, CEC signal transmission is temporally prioritized over CEC signal reception.

In an aspect, the received SDA signal 438, SCL signal 442, and CEC signal 446 are transmitted to slave I2C 108 over interface 534, via SDA interface 524, SCL interface 526, and CEC interface 528, respectively.

In an aspect, HDMI sink terminal may receive SDA signal 440, SCL signal 444, CEC signal 448, HPD signal 450, and an ARC signal 536 from slave I2C over interface 534, via SDA interface 524, SCL interface 526, CEC interface 528, HPD interface 530, and ARC interface 532, respectively. Of these signals, SDA signal 440 and SCL signal 444 are routed to DDC decoding and forwarding unit 514, CEC signal 446 is routed to CEC decoding and forwarding unit 520, and ARC signal 536 is routed to ARC driving unit 522. Of these signals, HPD signal 450 is directly routed to time division multiplex unit 518.

DDC decoding and forwarding unit 514 resolves any signal contention between SDA signal 438 and SDA signal 440, and SCL signal 442 and SCL signal 444. Once each signal contention is resolved to give temporal priority to receiving SDA signal 438 and SCL signal 442, DDC decoding and forwarding unit 514 transmits SDA signal 440 and SCL signal 444 to time division multiplex unit 518.

CEC decoding and forwarding unit 520, in conjunction with CEC arbitration 516, resolves any signal contention between CEC signal 446 and CEC signal 448. Once this signal contention is resolved to give temporal priority to receiving CEC signal 446, CEC decoding and forwarding unit 520 transmits CEC signal 448 to time division multiplex unit 518.

In an aspect, DDC decoding and forwarding unit 514 may transmit SDA signal 440 and SCL signal 444 in substantially real time at an interval of a local clock. CEC decoding and forwarding unit 529 may transmit CEC signal 448 in substantially real time at an interval of a local clock.

In an aspect, ARC signal 536 is an analog signal that is amplified and conditioned for transmission by ARC driving unit 522 to generate ARC signal 452. ARC signal 452 is routed to time division multiplex unit 518. In an aspect, ARC driving unit 522 may also be referred to as an ARC amplifying unit.

In an aspect, time division multiplex unit 518 receives SDA signal 440 and SCL signal 444 to be transmitted, from DDC decoding and forwarding unit 514. Time division multiplex unit 518 may also receive CEC signal 448 to be transmitted from CEC decoding and forwarding unit 520. Time division multiplex unit 418 may be configured to cyclically collect and combine SDA signal 440, SCL signal 444, CEC signal 448, HPD signal 450, and ARC signal 452. These signals are combined into a single-channel signal using time-division multiplexing. In an aspect, the SDA, SCL, CEC, HPD, and ARC signals to be transmitted may be combined in any arbitrary temporal arrangement.

The time-division multiplexed signals generated by time division multiplex unit 518 may be output to signal coding 508. Signal coding 508 may be configured to perform Manchester encoding on the time-division multiplexed signals. This enables synchronization between HDMI source terminal 204 and HDMI sink terminal 308. An output from signal coding 508 is transmitted to TX circuit 506. TX circuit 506 is a transmission (transmit) circuit that is configured to convert one or more electrical signals (containing the time-division multiplexed SDA, SCL, CEC, HPD and ARC signals) into optical signals for transmission over optical fiber 222. To achieve this functionality, TX circuit 506 may include one or more VCSELs (e.g., VCSEL 306). In this way, half-duplex communication of the HDMI SDA, SCL, CEC, HPD and ARC signals using one or more optical resources is accomplished.

In an aspect, among the HDMI SDA, SCL, HPD, CEC, and ARC signals, the ARC signals have a requirement for the transmission bandwidth, so 50% of the time-division multiplexing time slice may be occupied in time division multiplexing by the ARC signal, while the remaining communication bandwidth may be equally divided among the four signals CEC, HPD, SDA, and SCL.

In an aspect, HDMI sink terminal 308 modulates one or more HDMI signals (i.e., SDA, SCL, CEC, HPD and ARC) into a form suitable for transmission over a physical (i.e., optical) channel. Generally, narrow-band communication is adopted for wireless communication, and signals are modulated onto high-frequency carriers for transmission, while PAM (Pulse Amplitude Modulation) can be adopted for copper wire or optical fiber channels. By adopting the above communication protocol, communication delay is reduced to within 50 ns, and the compatibility of a final display transmission scheme with different devices is realized.

In an aspect, DDC decoding and forwarding unit 514 monitors the levels of SDA and SCL signal lines (i.e., SDA interface 524 and SCL interface 526) in real time. When clock extension and Read Request events are detected at the display of the equipment (e.g., an HDMI sink connected to slave I2C 108), the request is forwarded to the HDMI source terminal 204, thus informing the source equipment (e.g., an HDMI source connected to master I2C 102) to perform corresponding operations.

In an aspect, DDC decoding and forwarding unit 514 can analyze SDA and SCL signals sent by the HDMI source terminal 204, and feedback acknowledgement (ACK) and read data from the display device to the source equipment in time.

In an aspect, Manchester encoding may be used to encode all digital signals (i.e., SDA, SCL, CEC, and HPD signals) communicated between HDMI source terminal 204 and HDMI sink terminal 308. This enables communication between HDMI source terminal 204 and HDMI sink terminal 308 to be implemented without having to synchronize the clock signals of HDMI source terminal 204 and HDMI sink terminal 308.

In an aspect, the communication protocols between HDMI source terminal 204 and HDMI sink terminal 308 (also referred to as "wire-speed forwarding method") are not limited to a specific I2C (inter-integrated circuit) address, but can be applied to reading EDID signals, communication of HDCP and communication of SCDC. Compatibility can be achieved for all 128 addresses from 0x00 to 0x7F.

In an aspect, the functionalities of HDMI source terminal 204 and HDMI sink terminal 308 may be collectively described as "HDMI low-speed wire-speed forwarding." Functionalities of HDMI source interface 104 and HDMI sink interface 106 that include high-speed HDMI signal transmission may be referred to as "HDMI high-speed signal forwarding."

In one aspect, a circuit architecture for wire-speed forwarding of HDMI protocol low-speed signals, as realized by a combination of HDMI source terminal 204 and HDMI sink terminal 308, supports EDID information reading, HDCP, SCDC, clock extension and Read Request functions. A CEC bus arbitration problem is solved, an audio return is realized and an ARC port is driven, HPD signals are correctly controlled when cables are pulled out, and low cost, low delay, high reliability and high compatibility of the HDMI scheme are ensured.

A combination of HDMI source terminal 204 and HDMI sink terminal 308 solve the problem of half-duplex communication of active optical fiber low-speed signals in optical transmission, by providing a circuit for wire-speed forwarding of HDMI protocol low-speed signals and adaptively change the (half-duplex) communication direction.

In one aspect, HDMI source terminal 204 analyzes HDMI source interface signals (i.e., SDA, SCL, and CEC signals) in substantially real time, compresses the signals using time-division multiplexing, and transmits the compressed signals to HDMI sink terminal 308. HDMI source terminal 204 also receives reverse communication signals (i.e., SDA, SCL, CEC, HPD, and ARC signals) from the HDMI sink terminal 308, and decompresses (i.e., time-division demultiplexes) the reverse communication signals in substantially real time and transmits the decompressed signals to an HDMI source.

In one aspect, HDMI sink terminal 308 analyzes the signals (i.e., SDA, SCL, and CEC signals) received from the HDMI source terminal 204 in substantially real time, decompresses the signals using time-division demultiplexing, and transmits the decompressed signals to a display device (i.e., an HDMI sink). HDMI sink terminal 308 also compresses (i.e., time-division multiplexes) the SDA, SCL, CEC, HPD and ARC signals of the display device in substantially real time and transmits the compressed signals to HDMI source terminal 204.

One or more analysis modules of HDMI source terminal 204 (i.e., DDC decoding and forwarding unit 414, and CEC decoding and forwarding unit 416) and one or more analysis modules of HDMI sink terminal 308 (i.e., DDC decoding and forwarding unit 514, and CEC decoding and forwarding unit 520) switch IO (Input/Output) direction reasonably according to specific communication conditions, and realize low-delay bidirectional communication.

Figure 6:
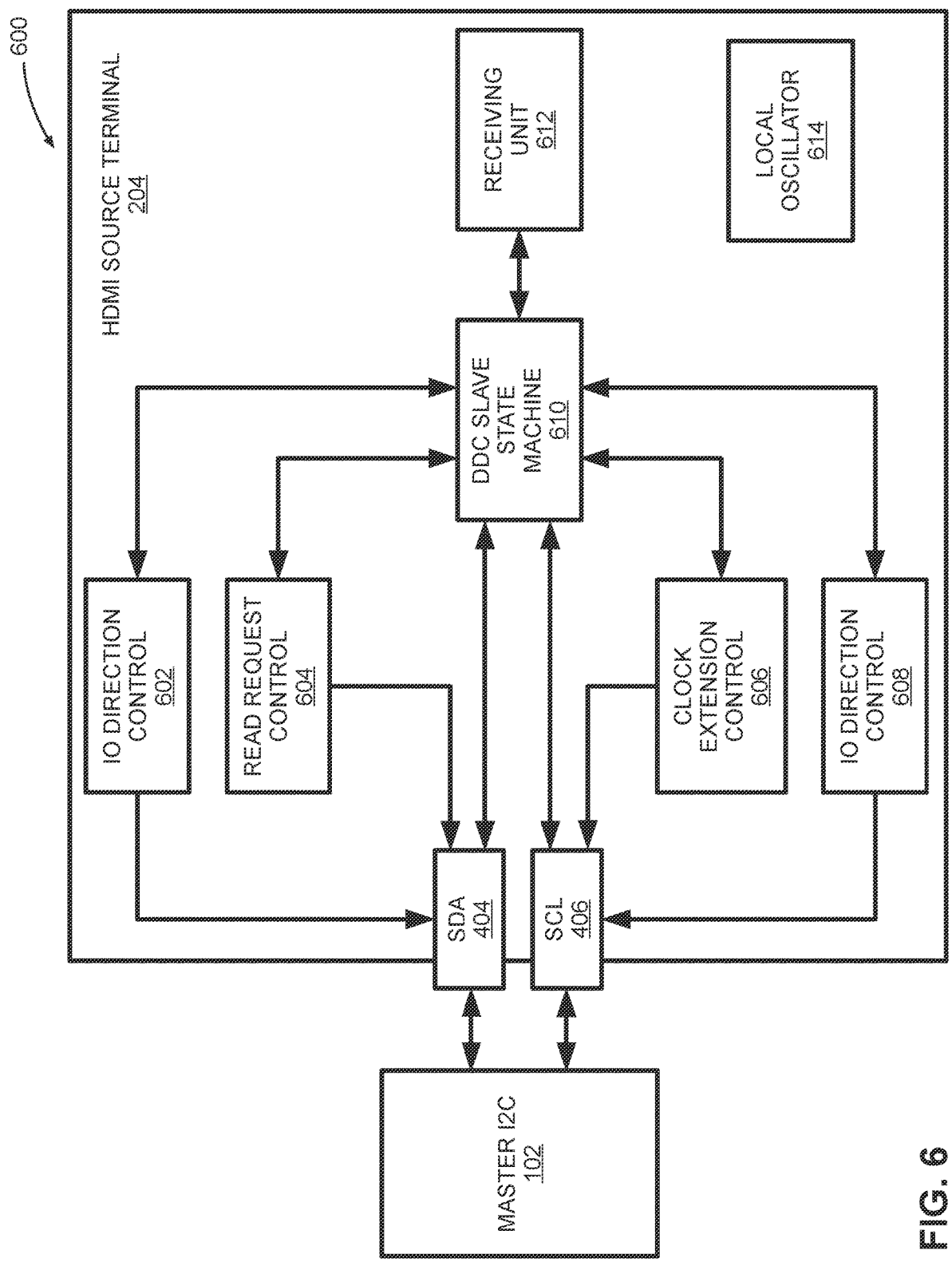
FIG. 6 is a block diagram depicting an interface between an HDMI source terminal and a master I2C.

FIG. 6 is a block diagram depicting an interface 600 between HDMI source terminal 204 and master I2C 102. Interface 600 depicts internal components of DDC decoding and forwarding unit 414. As depicted, HDMI source 204 includes an IO direction control 602, a read request control 604, a clock extension control 606, an IO direction control 608, a DDC slave state machine 610, a receiving unit 612, and a local oscillator 614.

In an aspect, DDC slave state machine 610 is configured to resolve a contention between SDA signal 438 and SDA signal 440, and between SCL signal 442 and SCL signal 444. In response to the contention resolution, IO direction control 602 and IO direction control 608 switch a direction of communication of SDA interface 404 and SCL interface 406 respectively, to transition between receive and transmit modes. For example, IO direction control 602 may switch a direction of communication of SDA interface 404 from an input (i.e., receiving SDA signal 438 from master I2C 102) to an output (i.e., transmitting SDA signal 440 to master I2C 102) once SDA signal 438 has been transmitted to HDMI sink terminal 308. This enables SDA signal 440 to be transmitted to master I2C 102 and then to an HDMI source associated with master I2C 102.

In an aspect, receiving unit 612 is configured to receive unpacked SDA signal 440 and unpacked SCL signal 444 (i.e., time-division demultiplexed SDA signal 440 and time-division demultiplexed SCL signal 444) from time division demultiplex unit 432. Local oscillator 614 supplies a clock signal to DDC slave state machine 610 and other components of HDMI source terminal 204.

In an aspect, DDC slave state machine 610 is configured to determine when to switch an IO direction for SDA interface 404 and/or SCL interface 406, or when to pull down the IO for either or both of these interfaces. In an aspect, local oscillator 614 may be a 100 MHz-400 MHz reconfigurable on-chip ring oscillator to clock the DDC slave state machine 610. DDC slave state machine 610 may be configured to perform filtering and reshaping operations on the DDC signals (i.e., the SDA and the SCL signals). Read request control 604 and clock extension control 606 may be configured to respectively support Read Request and clock stretching functions as defined in the HDMI protocol. In an aspect, functions of read request control 604 and clock extension control 606 may be governed by DDC slave state machine 610.

Figure 7:
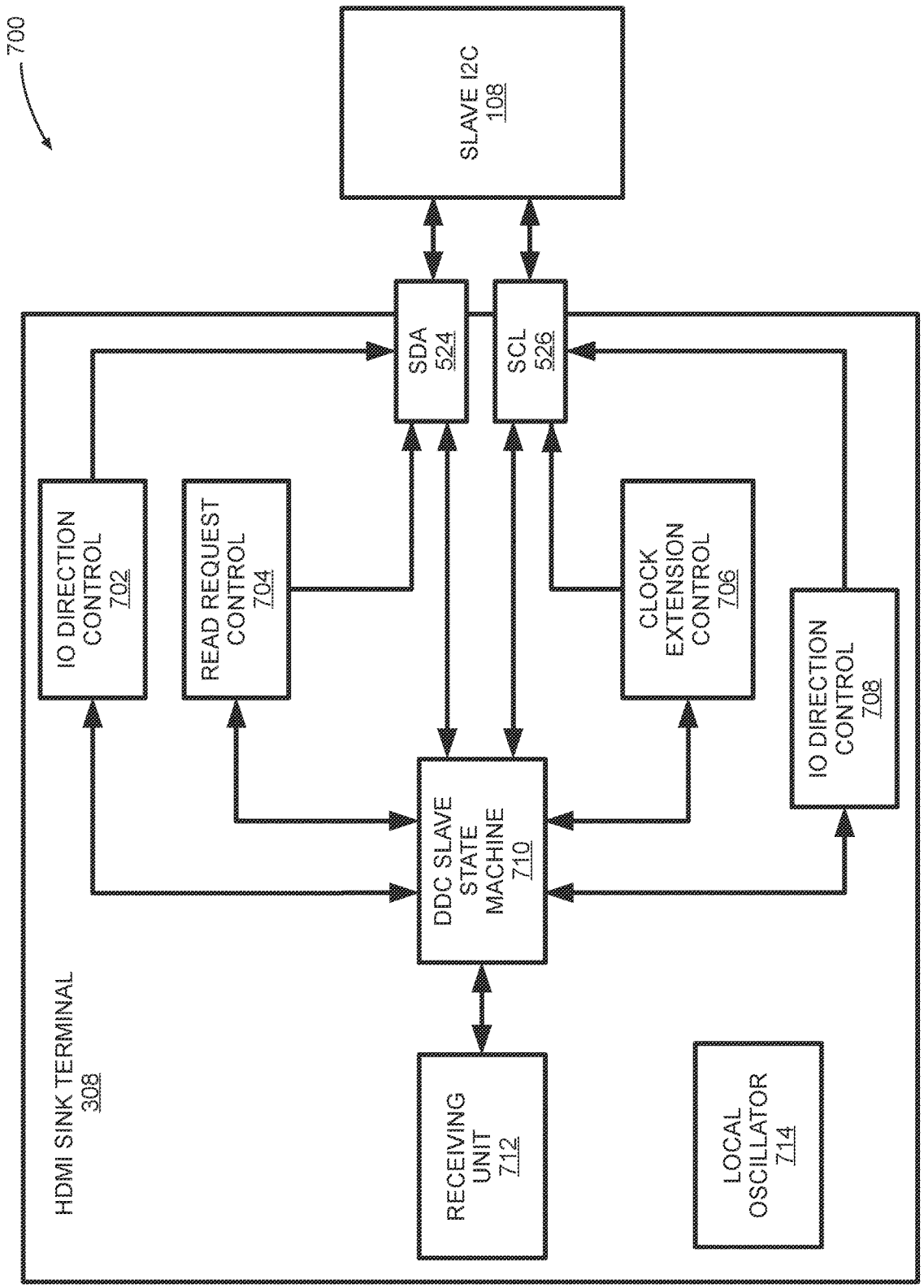
FIG. 7 is a block diagram depicting an interface between an HDMI sink terminal and a slave I2C.

FIG. 7 is a block diagram depicting an interface 700 between HDMI sink terminal 308 and slave I2C 108. Interface 700 depicts internal components of DDC decoding and forwarding unit 514. As depicted, HDMI sink 308 includes an IO direction control 702, a read request control 704, a clock extension control 706, an IO direction control 708, a DDC slave state machine 710, a receiving unit 712, and a local oscillator 714.

In an aspect, DDC slave state machine 710 is configured to resolve a contention between SDA signal 438 and SDA signal 440, and between SCL signal 442 and SCL signal 444. In response to the contention resolution, IO direction control 702 and IO direction control 708 switch a direction of communication of SDA interface 524 and SCL interface 526 respectively, to transition between receive and transmit modes. For example, IO direction control 602 may switch a direction of communication of SDA interface 524 from an input (i.e., receiving SDA signal 440 from slave I2C 108) to an output (i.e., transmitting SDA signal 438 to slave I2C 108) prior to transmitting SDA signal 440 has been transmitted to HDMI source terminal 204. This enables SDA signal 438 to be transmitted to slave I2C 108 and then to an HDMI sink associated with slave I2C 108.

In an aspect, receiving unit 712 is configured to receive unpacked SDA signal 438 and unpacked SCL signal 442 (i.e., time-division demultiplexed SDA signal 438 and time-division demultiplexed SCL signal 442) from time division demultiplex unit 512. Local oscillator 714 supplies a clock signal to DDC slave state machine 710 and other components of HDMI sink terminal 308.

In an aspect, DDC slave state machine 710 is configured to determine when to switch an IO direction for SDA interface 524 and/or SCL interface 526, or when to pull down the IO for either or both of these interfaces. In an aspect, local oscillator 714 may be a 100M~400 MHz reconfigurable on-chip ring oscillator to clock the DDC slave state machine 710. DDC slave state machine 710 may be configured to perform filtering and reshaping operations on the DDC signals (i.e., the SDA and the SCL signals). Read request control 704 and clock extension control 706 may be configured to respectively support Read Request and clock stretching functions as defined in the HDMI protocol. In an aspect, functions of read request control 704 and clock extension control 706 may be governed by DDC slave state machine 710.

In an aspect, DDC decoding and forwarding unit 414 and DDC decoding and forwarding unit 514 support single read-write or continuous read-write operation for any I2C device address, support pulling down the associated SCL pin at the HDMI source to inform the HDMI source device of clock extension when HDMI source terminal 204 sends a clock extension signal. DDC decoding and forwarding unit 414 and DDC decoding and forwarding unit 514 may support pulling down the SDA pin of the source to inform the source device when the HDMI sink terminal 308 sends a Read Request signal, and requesting to initiate DDC communication to an A8 address.

In an aspect, DDC decoding and forwarding unit 414 and DDC decoding and forwarding unit 514 each includes a DDC slave state machine (i.e., DDC slave state machines 610 and 710, respectively) operating in substantially real-time, configured to forward communication signals in substantially real-time according to the communication sent by a master I2C. These DDC slave state machines may each update a communication state at the same time. Each state machine can analyze whether master I2C 102 is waiting for an ACK signal (return signal) from slave I2C 108, or waiting for reading data in real time, thus switching IO communication direction and forwarding signals received from slave I2C 108 to master I2C 102 in time to realize substantially real-time I2C communication forwarding.

In an aspect, each of DDC decoding and forwarding unit 414 and DDC decoding and forwarding unit 514 can analyze one or more instructions of clock extension and Read Request according to the signals sent from I2C (i.e., master I2C 102 and slave I2C 108, respectively), and control associated SDA and SCL pins (interfaces) to forward these two requests.

In one aspect, power to HDMI source interface 104 may be provided by the HDMI source or an external input power supply. Power to HDMI sink interface 106 may be provided by the HDMI sink (i.e., the HDMI display device) or an external input power supply. In one aspect, HDMI optical communication system 100 can detect the plugging and unplugging state of the associated optical cable under the conditions of supporting HPD signals, supplying power outside of HDMI sink terminal 308, or supplying power by the HDMI sink.

In one aspect, in the HDMI sink terminal 308, the ARC signals taken out from the Utility pin and the HPD pin are used to generate an ARC signal by subtracting signal a on an ARC pin (e.g., ARC interface 532) from a signal on HPD pin (e.g., HPD interface 530). In an aspect, this analog signal subtraction may be performed using a differential amplifier. The resultant ARC signal generated by the subtraction is amplified by the ARC signal amplifying unit. After being transmitted to HDMI source terminal 204, ARC signal 452 is adjusted, by ARC driving unit 436, to a level range conforming to the HDMI protocol specification for output, and a certain driving capability is provided. Specifically, ARC driving unit 436 converts ARC signal 452 transmitted from the HDMI sink into ARC signal 454 conforming to the HDMI level standard. ARC signal 454 may be used to drive a peripheral circuit.

In an aspect, the DDC slave state machine 610 functions as a DDC slave, in a sense that DDC slave state machine 610 when I2C master 102 is writing or reading, or needs acknowledgment. This information is transformed to IO direction decisions by DDC slave state machine 610. For example, during writing, the IO direction is from the master I2C 102 to slave I2C 108, while during reading and acknowledgment, the IO direction is from I2C slave 108 to the I2C master 102. Similarly, DDC slave 710 state machine uses DDC signals transmitted from HDMI source terminal 204 to judge if I2C master 102 is writing or reading, or needs acknowledgment, and changes the IO direction accordingly.

For read request control, the read request is launched by HDMI sink terminal 308, to inform HDMI source terminal 204 to read the status information from slave I2C 108. In this case, read request control 704 on the HDMI sink terminal 308 will check if I2C slave 108 is pulling down the SDA signal for a long enough time to start a read request. This read request information is packed and transmitted through bidirectional optical communication channel 428 to the source HDMI terminal 308. On receiving the read request information, read request control 604 on HDMI source terminal 204 will pull down the SDA signal for enough to inform I2C master 102 accordingly.

Figure 8:
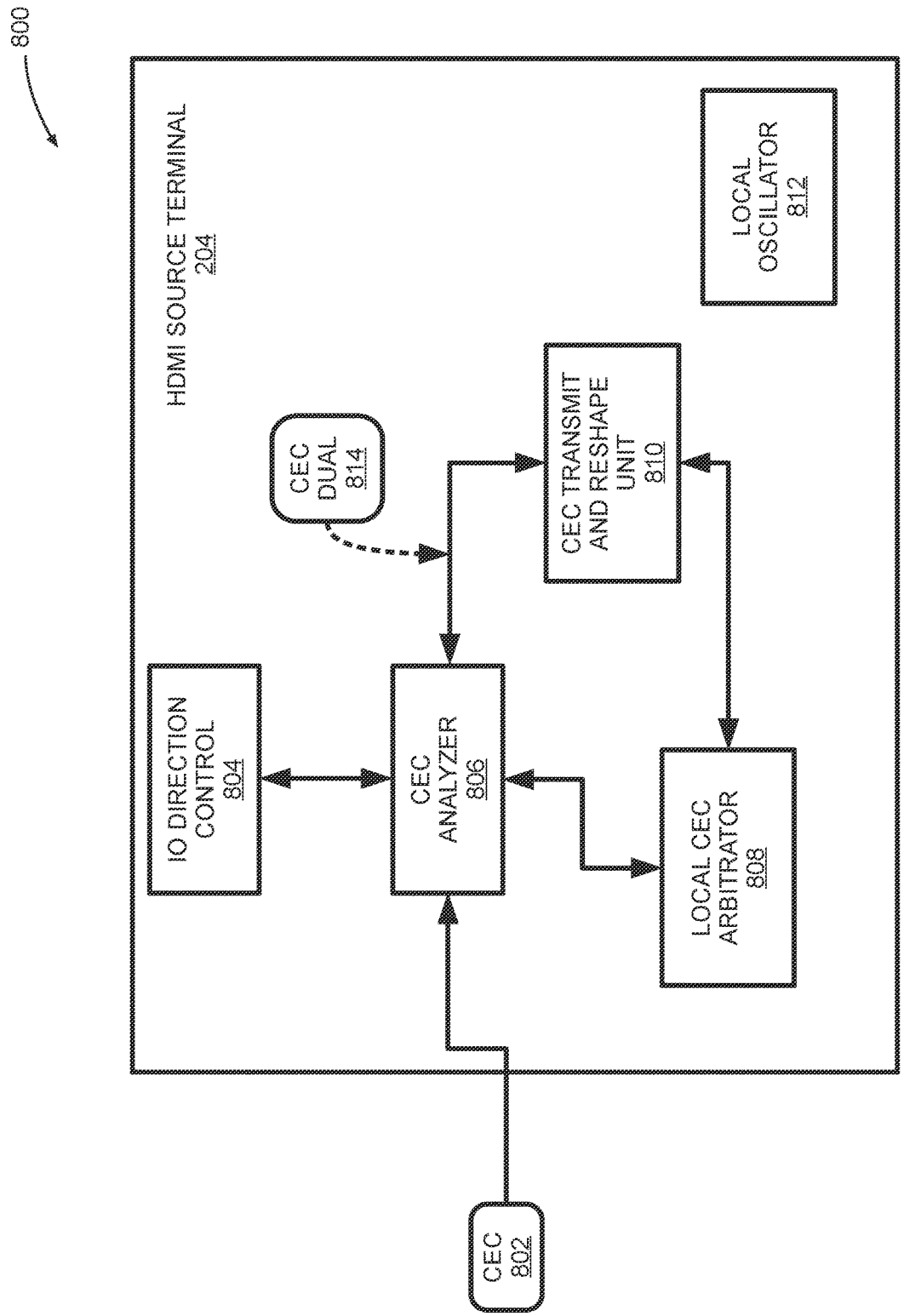
FIG. 8 is a block diagram depicting a CEC connection topology.

FIG. 8 is a block diagram depicting a CEC connection topology 800. As depicted, CEC connection topology 800 depicts HDMI source terminal 204 including components included in CEC decoding and forwarding unit 416. HDMI source terminal 204 may include an IO direction control 804, a CEC analyzer 806, a local CEC arbitrator 808, a CEC transmit and reshape unit 810, and a local oscillator 812.

In an aspect, CEC analyzer 806 may be configured to receive CEC signal 446 and CEC signal 448. Each of these signals may be received separately by CEC analyzer 806 as a CEC signal 802, and a CEC dual signal 814, respectively. Local CEC arbitrator 808 may be configured to analyze the received CEC signals and resolve contention between these signals. Responsive to local CEC arbitrator 808 resolving the contention, CEC analyzer 806 may be configured to switch an IO direction to prioritize transmission of CEC signal 446. In an aspect, CEC transmit and reshape unit only transmits the winner CEC signal from the contention resolution. The CEC transaction direction of the associated communication link is held until the end of the CEC transaction. Local oscillator 812 supplies a clock signal to the different components of CEC decoding and forwarding unit 416.

A similar architecture may be used to implement CEC decoding and forwarding unit 520. In one aspect, CEC decoding and forwarding units 416 and 520 each perform respective CEC signal decoding and determine an associated UI direction. CEC arbitration units 434 and 516 respectively manage any associated arbitration between a local CEC bus transaction and a received CEC transaction unpacked from bidirectional optical communication channel 428 to decide whether to forward the local CEC transaction or the received CEC transaction.

Figure 9:
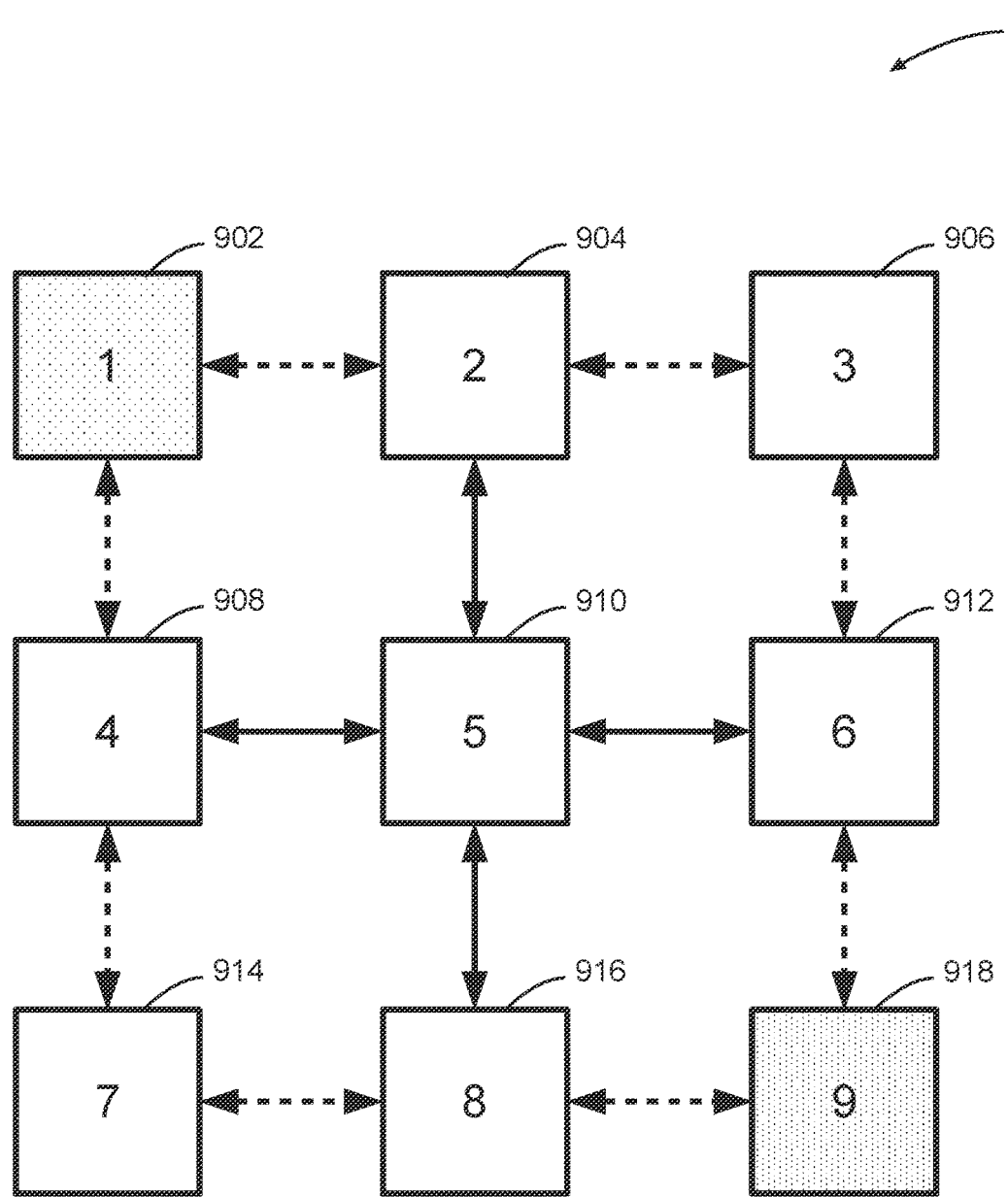
FIG. 9 is a schematic diagram depicting a CEC connection topology that uses a wired AND connectivity.

FIG. 9 is a schematic diagram depicting a CEC connection topology 900 that uses a wired AND connectivity as implemented in the prior art. In an aspect, the wired AND connectivity is used to realize a bidirectional communication protocol associated with a communication bus such as a CEC bus. As depicted, connection topology 900 includes a node 1 902, a node 2 904, a node 3 906, a node 4 908, a node 5 910, a node 6 912, a node 7 914, a node 8 916, and a node 9 918. Each node is connected to at least two other nodes via a bidirectional wired AND communication link as depicted in FIG. 9.

In an aspect, each of node 1 902 through node 9 918 may represent a CEC node. Topology 900 may be subject to CEC bus deadlocks. For example, node 1 902 might send a CEC request to node 9 918. This CEC request sent by node 1 may sent back to node 1 after several CEC transactions (as indicated by the bidirectional dashed arrow paths in FIG. 9), and this delayed request will also be wire ANDed with the request being send out by node 1 902. This occurrence of the CEC request being sent back to node 1 902 is a result of full-time bidirectional wire AND paths being implemented in topology 900. The wire ANDing of the original request from node 1 902 and the replica request received back at node 1 902 via a route traced out by some combination of the bidirectional paths will cause CEC arbitration failure on node 1 902. This is one example of how a wired AND method may cause a deadlock on a CEC bus, which stops nodes from sending CEC requests.

Figure 10:
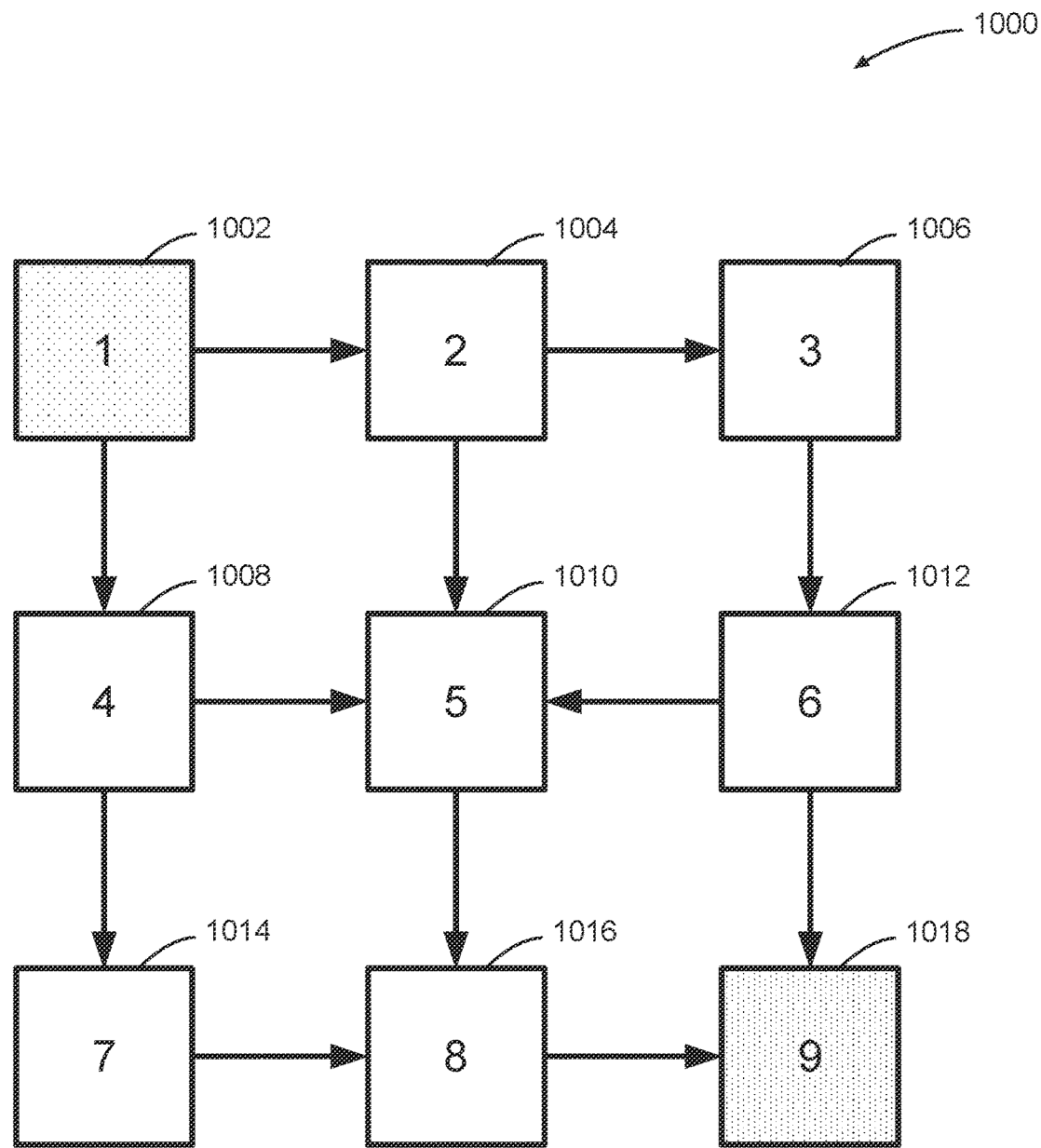
FIG. 10 is a schematic diagram depicting a CEC connection topology that uses a CEC analyzer.

FIG. 10 is a schematic diagram depicting a CEC connection topology 1000 that uses a CEC analyzer, such as CEC analyzer 416. As depicted, connection topology 900 includes a node 1 1002, a node 2 1004, a node 3 1006, a node 4 1008, a node 5 1010, a node 6 1012, a node 7 1014, a node 8 1016, and a node 9 1018. Each of node 1 1002 through node 9 1018 may include a CEC analyzer such as CEC analyzer 416. Using CEC arbitration logic (i.e., using a CEC analyzer) enables connection topology 1000 to avoid CEC bus deadlocks as encountered on connection topology 900.

Returning to the example presented for topology 900, where node 1 902 sends a CEC request to node 9 918, in topology 1000 CEC node (i.e., node 2 904 through node 9 918) performs local CEC arbitration with an adjacent node using, for example CEC analyzer 416 or 420. The "CEC transmitter" will only transmit the winner CEC signal from the arbitration resolution. Furthermore, each communication link from each node to an adjacent node is held at a unidirectional transmission path till the CEC transaction is complete. In this case, all communication links are held in their assigned unidirectional paths as depicted in FIG. 10, till the CEC request from node 1 1002 to node 9 1018 is complete. As depicted in FIG. 10, tracing any path along the unidirectional links starting at node 1 1002 ultimately leads to node 9 1018, without any ambiguity or any chance of the CEC request being returned to node 1 1002. This feature prevents any deadlocks on the CEC bus. A communication direction of each unidirectional communication link can be arbitrarily switched by the associated CEC analyzer logic in the terminal nodes by appropriate CEC arbitration. Topology 1000 implements half-duplex CEC request communication over a mesh network while virtually eliminating any occurrence of CEC bus deadlocks.

Topology 1000 represents CEC arbitration communication that includes the process of CEC signal arbitration. HDMI source terminal 204, CEC decoding and forwarding unit analyzes the CEC signal of the HDMI source and forwards it to the display device (i.e., the HDMI sink) over the optical communication resources, and CEC arbitration 434 determines the communication direction of CEC signals according to the signals of the HDMI source and the display devices.

In HDMI sink terminal 308, CEC decoding and forwarding unit 520 analyzes the CEC signal of the display device (i.e., the HDMI sink) and forwards it to the HDMI source over the optical communication resources, and the CEC arbitration unit determines the communication direction of CEC according to the signals of the HDMI source and display devices.

In one aspect, the bus arbitration method in a CEC single bus communication scheme is transplanted to point-to-point communication such as optical transmission or wireless transmission as implemented in topology 1000, and the bus communication of CEC is mapped to routing communication in point-to-point communication by using the method of local arbitration and arbitration result routing.

Each node in topology 1000 represents a communication node of HDMI. The overall topology 1000 is the topology of an HDMI-based network, and a communication mode associated with each of node 1002 through node 1018 is point-to-point communication. In one aspect, each of node 1002 through node 1018 has a local CEC arbitration unit similar to CEC arbitration 434 or CEC arbitration 516, and each node conducts local arbitration. After the arbitration fails, the original communication direction will be switched, so the CEC communication that fails in arbitration will not be transmitted any more. For example, if node 8 1016 node in topology 1000 fails in arbitration, the communication sent by it will no longer be transmitted, and CEC communication sent by, for example, node 4 1008 will be broadcast in the form of flooding in the whole network.

Figure 11:
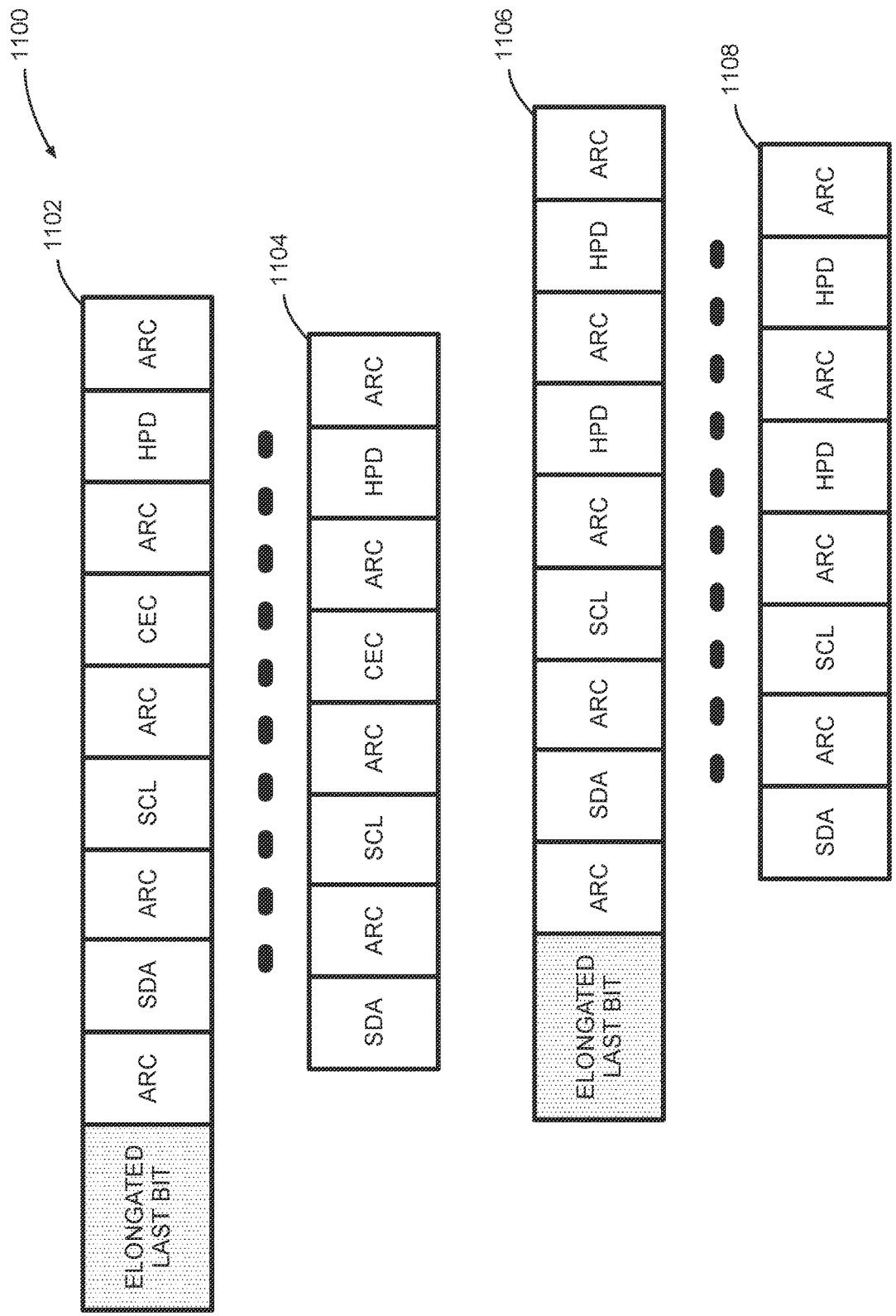
FIG. 11 is a schematic diagram depicting an encoding scheme for HDMI signals.

FIG. 11 is a schematic diagram depicting an encoding scheme 1100 for HDMI signals. As depicted, encoding scheme 1100 includes an initial part 1102 of a first data packet, a terminal part 1104 of the first data packet, an initial part 1106 of a second data packet, and a terminal part 1108 of the second data packet. In an aspect, each data packet may include a sequence of signals: ARC, SDA, ARC, SCL, ARC, CEC, ARC, and HPD, with the sequence repeating. Inserting an ARC signal in every other data slot in the data packet ensures that the ARC signal is given the required 50% bandwidth. The data structure of each packet is such that the analog ARC signal alternates with a piece of digital data. In one aspect, digital data in each data packet may be encoded using Manchester encoding. For example, logic 1 of a control signal may be encoded as 111000. Encoding scheme may be used for all HDMI optical signaling supported by HDMI optical communication system 100.

In one aspect, a start of a data packet is designated by an elongated last bit sequence from the data packet immediately before the data packet, as indicated in FIG. 11. In other words, the elongated bit sequence from the previous data packet acts as a header for the current data packet. For example, if the last bit sequence is 000111 of the previous data packet, the header of the next packet is set to be 111111. In this case there will be 9 "1"s in a row, so the synchronization logic can use a counter to detect the packet header. With this encoding, a clock difference of 16.6% between two link partners (e.g., HDMI source terminal 204 and HDMI sink terminal 308) can be tolerated. So, instead of using off-chip reference clock as contemporary systems, HDMI optical communication system 100 uses on chip ring oscillators to clock the whole system.

In one aspect, the clocks on two sides of the link partner (i.e., the clocks on HDMI source terminal 204 and HDMI sink terminal 308) may be coarsely calibrated to approximately the same frequency. The synchronization method in this invention obviates the need of a clock and data recovery (CDR) system or of a precise reference clock.

In one aspect, the ring oscillator in each of HDMI source terminal 204 and HDMI sink terminal 308 may be set to 400 MHz. This enables 40 MHz oversampling t be performed on ARC signals, which is sufficient for ARC signal transmission.

Figure 12:
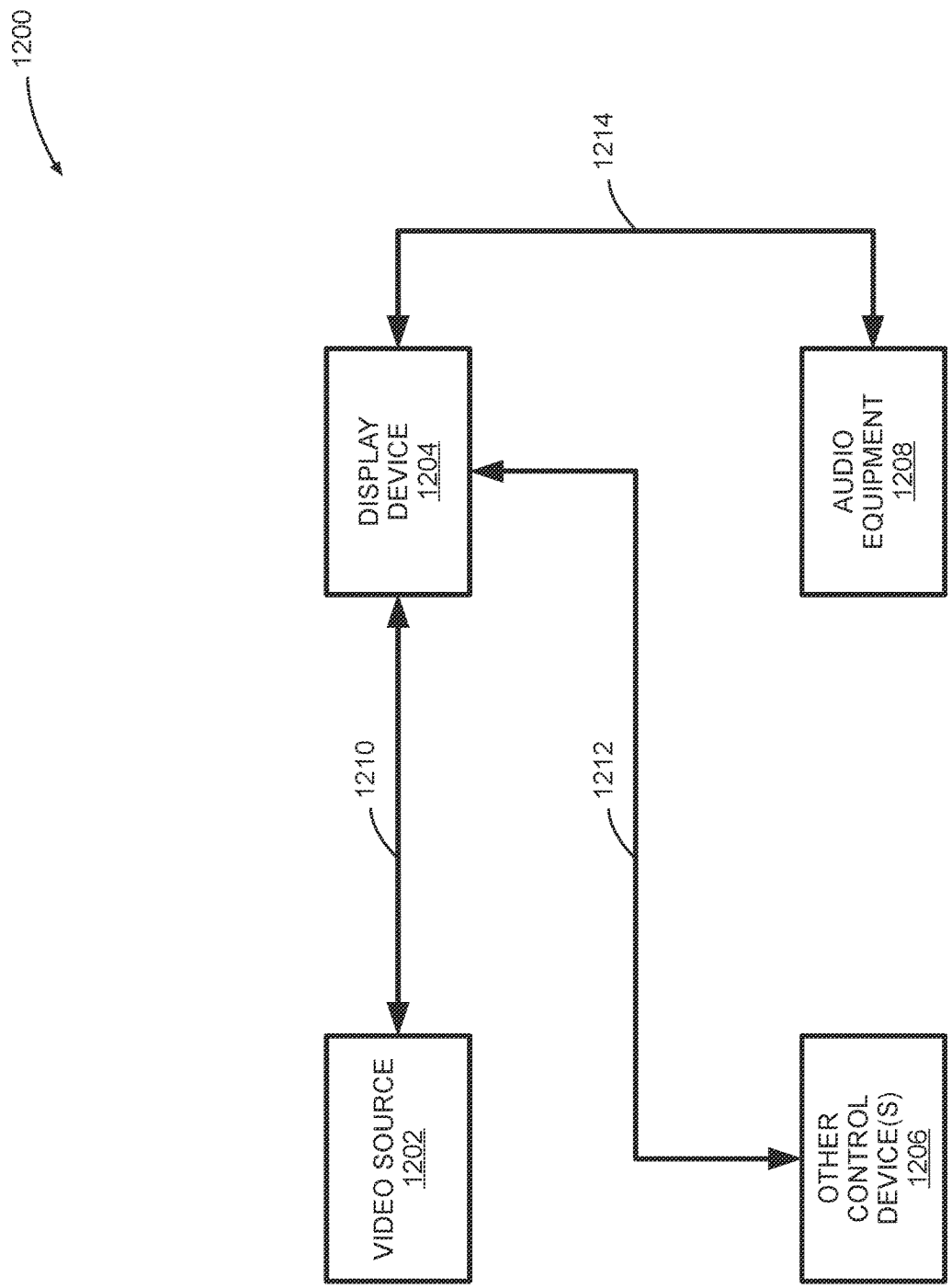
FIG. 12 is a block diagram depicting an example system architecture of multiple HDMI sources connected to a single HDMI display device.

FIG. 12 is a block diagram depicting an example system architecture 1200 of multiple HDMI sources connected to a single HDMI display device. As depicted, system architecture 1200 includes a video source 1202, other control devices 1206, audio equipment 1208, and a display device 1204. In aspect, display device 1204 is an HDMI display device. In an aspect, display device 1204 is individually communicatively coupled with each of video source 1202, other control devices 1206, and audio equipment 1208, via an communication link that includes HDMI optical communication system 100.

System architecture 1200 demonstrates how a plurality of different HDMI sources can be connected to an HDMI sink via HDMI optical communication system 100 using optical communication links, with HDMI optical communication system 100 being used to implement each optical communication link. In one aspect, HDMI optical communication system 100 may be implemented as a first active HDMI cable and used to connect display device 1204 with the video source 1202. HDMI optical communication system 100 may be implemented as a second active HDMI cable and used to connect display device 1204 with the audio equipment 1208 (e.g. an audio output device), supporting the audio return function (ARC). Other control devices 1206 may also connected to display device 1204 via HDMI optical communication system 100 may be implemented as a third HDMI cable of a traveling source. Tests show that the low-speed forwarding circuit (i.e., HDMI optical communication system 100) can support the video source equipment to transmit video signals of HDMI1.4, HDMI2.0 and HDMI2.1 protocols, and can support arbitrary switching of resolution from 480p to 4K/60 Hz, CEC control function and audio return function.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
   receiving an HDMI control signal from an HDMI master device;
   receiving another HDMI control signal from an HDMI sink terminal via a communication resources;
   identifying half-duplex communication resource contention between the HDMI control signal and the other HDMI control signal;
   transitioning a communication direction of the half-duplex communication resources to give the HDMI control signal precedence over the other HDMI control signal;
   subsequent to transitioning the communication direction, transferring the HDMI control signal to the HDMI sink terminal via the communication resources; and
   subsequent to transferring the HDMI control signal:
      again transitioning the direction of the half-duplex communication resources; and
      transferring the other HDMI control signal to the HDMI master device.

2. The method of claim 1, further comprising:
   determining an SCL contention between an SCL signal received from the HDMI master and another SCL signal received from the HDMI sink terminal;
   switching a communication direction between an SCL transmit function and an SCL receive function responsive to a read or write command issued by the HDMI master;

responsive to switching the communication direction to the SCL transmit function, transmitting the SCL signal to the HDMI sink terminal via the communication resources; and responsive to switching the communication direction to the SCL receive function, transmitting the other SCL signal to the HDMI master.

3. The method of claim 1, further comprising:

determining an SDA contention between an SDA signal received from the HDMI master and another SDA signal received from the HDMI sink terminal;

switching a communication direction between an SDA transmit function and an SDA receive function responsive to a read or write command issued by the HDMI master;

responsive to switching the communication direction to the SDA transmit function, transmitting the SDA signal to the HDMI sink terminal via the communication resources; and responsive to switching the communication direction to the SDA receive function, transmitting the other SDA signal to the HDMI master.

4. The method of claim 1, further comprising:

determining a CEC contention between a CEC signal received from the HDMI master and another CEC signal received from the HDMI sink terminal;

switching a communication direction between a CEC transmit function and a CEC receive function responsive to a read or write command issued by the HDMI master;

responsive to switching the communication direction to the CEC transmit function, transmitting the CEC signal to the HDMI sink terminal via the communication resources; and responsive to switching the communication direction to the CEC receive function, transmitting the other CEC signal to the HDMI master.

5. The method of claim 1, wherein the HDMI control signal is received from the HDMI master device via an I2C communication protocol.

6. The method of claim 1, wherein the HDMI control signal is any of an SDA signal, an SCL signal, or a CEC signal.

7. The method of claim 6, wherein the ARC signal is an analog signal.

8. The method of claim 7, wherein the converting is performed by a VCSEL.

9. The method of claim 1, further comprising receiving an ARC signal from the HDMI sink terminal.

10. The method of claim 1, further comprising converting the HDMI control signal from an electrical signal to an optical signal prior to transferring the HDMI control signal to the HDMI sink terminal via the communication resources.

11. The method of claim 1, further comprising converting the other HDMI control signal from an optical signal to an electrical signal subsequent to receiving the other HDMI control signal from the HDMI sink terminal via the communication resources.

12. A method comprising:

receiving an HDMI control signal from an HDMI slave device;

receiving another HDMI control signal from an HDMI source terminal via a communication resources;

identifying half-duplex communication resource contention between the HDMI control signal and the other HDMI control signal;

transitioning a communication direction of the half-duplex communication resources to give the other HDMI control signal precedence over the HDMI control signal;

subsequent to transitioning the communication direction, transferring the other HDMI control signal to the HDMI slave device; and subsequent to transferring the other HDMI control signal:

again transitioning the direction of the half-duplex communication resources; and transferring the HDMI control signal to the HDMI source terminal via the communication resources.

13. The method of claim 12, further comprising:

determining an SCL contention between an SCL signal received from the HDMI slave device and another SCL signal received from the HDMI source terminal;

switching a communication direction between an SCL transmit function and an SCL receive function responsive to a read or write command received from the HDMI source terminal;

responsive to switching the communication direction to the SCL receive function, transmitting the other SCL signal to the HDMI slave device; and responsive to switching the communication direction to the SCL transmit function, transmitting the SCL signal to the HDMI source terminal via the communication resources.

14. The method of claim 12, further comprising:

determining an SDA contention between an SDA signal received from the HDMI slave device and another SDA signal received from the HDMI source terminal;

switching a communication direction between an SDA transmit function and an SDA receive function responsive to a read or write command received from the HDMI source terminal;

responsive to switching the communication direction to the SDA receive function, transmitting the other SDA signal to the HDMI slave device; and responsive to switching the communication direction to the SDA transmit function, transmitting the SDA signal to the HDMI source terminal via the communication resources.

15. The method of claim 12, further comprising:

determining a CEC contention between a CEC signal received from the HDMI slave device and another CEC signal received from the HDMI source terminal;

switching a communication direction between a CEC transmit function and a CEC receive function responsive to a read or write command received from the HDMI source terminal;

responsive to switching the communication direction to the CEC receive function, transmitting the other CEC signal to the HDMI slave device; and responsive to switching the communication direction to the CEC transmit function, transmitting the CEC signal to the HDMI source terminal via the communication resources.

16. The method of claim 12, wherein the HDMI control signal is received from the HDMI slave device via an I2C communication protocol.

17. The method of claim 12, wherein the HDMI control signal is any of an SDA signal, an SCL signal, or a CEC signal.

18. The method of claim 12, further comprising receiving an ARC signal from the HDMI slave device.

19. The method of claim 18, wherein the ARC signal is an analog signal.

20. The method of claim 12, further comprising converting the HDMI control signal from an electrical signal to an optical signal prior to transferring the HDMI control signal to the HDMI source terminal via the communication resources.

21. The method of claim 20, wherein the converting is performed by a VCSEL.

22. The method of claim 12, further comprising converting the other HDMI control signal from an optical signal to an electrical signal subsequent to receiving the other HDMI control signal from the HDMI source terminal via the communication resources.

\* \* \* \* \*

UNITED STATES PATENT AND TRADEMARK OFFICE
CERTIFICATE OF CORRECTION

PATENT NO. : 11,356,237 B1
APPLICATION NO. : 17/219591
DATED : June 7, 2022
INVENTOR(S) : Jianming Yu It is certified that error appears in the above-identified patent and that said Letters Patent is hereby corrected as shown below:

In the Specification

In Column 1, Line 66, a "(" should be added before the 3.
In Column 21, Line 59, "t" should be corrected to "to.".

Signed and Sealed this
Fourth Day of October, 2022

*Katherine Kelly Vidal*

Katherine Kelly Vidal
*Director of the United States Patent and Trademark Office*